United States Patent
Tada et al.

(10) Patent No.: US 11,645,089 B2
(45) Date of Patent: May 9, 2023

(54) NETWORK SYSTEM

(71) Applicant: DENSO CORPORATION, Kariya (JP)

(72) Inventors: Akira Tada, Kariya (JP); Tomohisa Kishigami, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/537,709

(22) Filed: Nov. 30, 2021

(65) Prior Publication Data

US 2022/0179663 A1 Jun. 9, 2022

(30) Foreign Application Priority Data

Dec. 3, 2020 (JP) .............................. JP2020-201229

(51) Int. Cl.
*G06F 9/4401* (2018.01)
*H04L 12/10* (2006.01)

(52) U.S. Cl.
CPC ............ *G06F 9/4418* (2013.01); *H04L 12/10* (2013.01)

(58) Field of Classification Search
CPC ............................... G06F 9/4418; H04L 12/10
See application file for complete search history.

(56) References Cited

U.S. PATENT DOCUMENTS

| 6,047,380 A * | 4/2000 | Nolan | G06F 1/28 713/502 |
| 11,526,458 B2 * | 12/2022 | Rennig | H04L 7/0016 |
| 2002/0172097 A1 * | 11/2002 | Freed | G06F 1/3203 368/108 |
| 2006/0259207 A1 * | 11/2006 | Natsume | G06F 8/65 701/1 |
| 2010/0305723 A1 * | 12/2010 | Koyama | H04L 12/40039 700/90 |
| 2011/0046844 A1 * | 2/2011 | Honner | H04L 12/462 701/31.4 |
| 2013/0326255 A1 * | 12/2013 | Kodama | H04L 12/40039 713/323 |
| 2014/0047255 A1 * | 2/2014 | Sasaki | H04L 12/40 713/323 |
| 2014/0241370 A1 * | 8/2014 | Itou | H04L 45/44 370/396 |
| 2015/0106529 A1 * | 4/2015 | Kang | G06F 21/41 709/229 |
| 2019/0184774 A1 * | 6/2019 | Okada | G07C 5/0808 |
| 2020/0094755 A1 * | 3/2020 | Kaneko | G06F 9/4418 |

(Continued)

FOREIGN PATENT DOCUMENTS

JP 2013107453 A 6/2013

*Primary Examiner* — Aurel Prifti
(74) *Attorney, Agent, or Firm* — Harness, Dickey & Pierce, P.L.C.

(57) ABSTRACT

A network system includes at least one transmission path and a plurality of terminal devices each connected to the transmission path. Each of the terminal devices includes a transceiver, a startup processing unit, and a switching unit. The transceiver is configured to operate either one of a first standby unit and a second standby unit according to a switching instruction. The switching unit is configured to output the switching instruction to the transceiver to operate the second standby unit when a transmission path empty period lasts for a predetermined preparation time or more after a non-designation period has lasted for a predetermined operation determination time or more.

10 Claims, 14 Drawing Sheets

(56) References Cited

U.S. PATENT DOCUMENTS

2020/0313928 A1* 10/2020 Watanabe ............. H04W 88/04
2020/0344090 A1* 10/2020 Park ........................ H04L 12/66
2021/0009054 A1* 1/2021 Hirano ................ B60R 16/0231

* cited by examiner

| STARTUP GROUP | BELONGING ECU |
|---|---|
| Gr_A | ECU_1A,ECU_3AB |
| Gr_B | ECU_1BC,ECU_2B,ECU_3AB |
| Gr_C | ECU_1BC,ECU3C |

NETWORK SYSTEM

CROSS REFERENCE TO RELATED APPLICATION

This application is based on Japanese Patent Application No. 2020-201229 filed on Dec. 3, 2020, the disclosure of which is incorporated herein by reference.

TECHNICAL FIELD

This disclosure relates to a network system that is configured to reduce power consumption.

BACKGROUND

A vehicle is equipped with a large number of electronic control units, so-called ECUs, to control in-vehicle equipment. These ECUs are connected to a communication bus, thereby building a network system that uses the ECUs as nodes. For such a network system, there has been known a technique called a partial network that reduces power consumption in the whole network system by, according to the state, bringing some ECUs unnecessary for control into a sleep state where the functions of the ECUs are stopped.

SUMMARY

According to one aspect of the present disclosure, a network system including at least one transmission path and a plurality of terminal devices each connected to the transmission path. Each of the terminal devices includes a transceiver, a startup processing unit, and a switching unit. The transceiver includes a first standby unit and a second standby unit and is configured to operate either one of the first standby unit and the second standby unit according to a switching instruction.

The first standby unit is configured to change the terminal device from a sleep state where a designation function is stopped to a wakeup state where the designation function is executable when receiving a designation management frame. The designation management frame is a type of a communication frame transmitted and received through the transmission path and is given at least startup information necessary for identifying a startup group to which the terminal device belongs. The second standby unit is configured to change the terminal device from the sleep state to the wakeup state when receiving any communication frame. The second standby unit is configured to operate with power consumption lower than the first standby unit.

The startup processing unit is configured to: transmit the designation management frame to the transmission path while an internal factor continues when the terminal device wakes up by the internal factor that is a factor other than that of receiving the designation management frame; and not transmit the designation management frame to the transmission path when the internal factor is not generated.

The switching unit is configured to output the switching instruction to the transceiver to operate the second standby unit when a transmission path empty period during which the communication frame is neither transmitted nor received through the transmission path lasts for a predetermined preparation time or more after a non-designation period during which the designation management frame is not received through the transmission path has lasted for a predetermined operation determination time or more.

DETAILED DESCRIPTION

Figure 1:
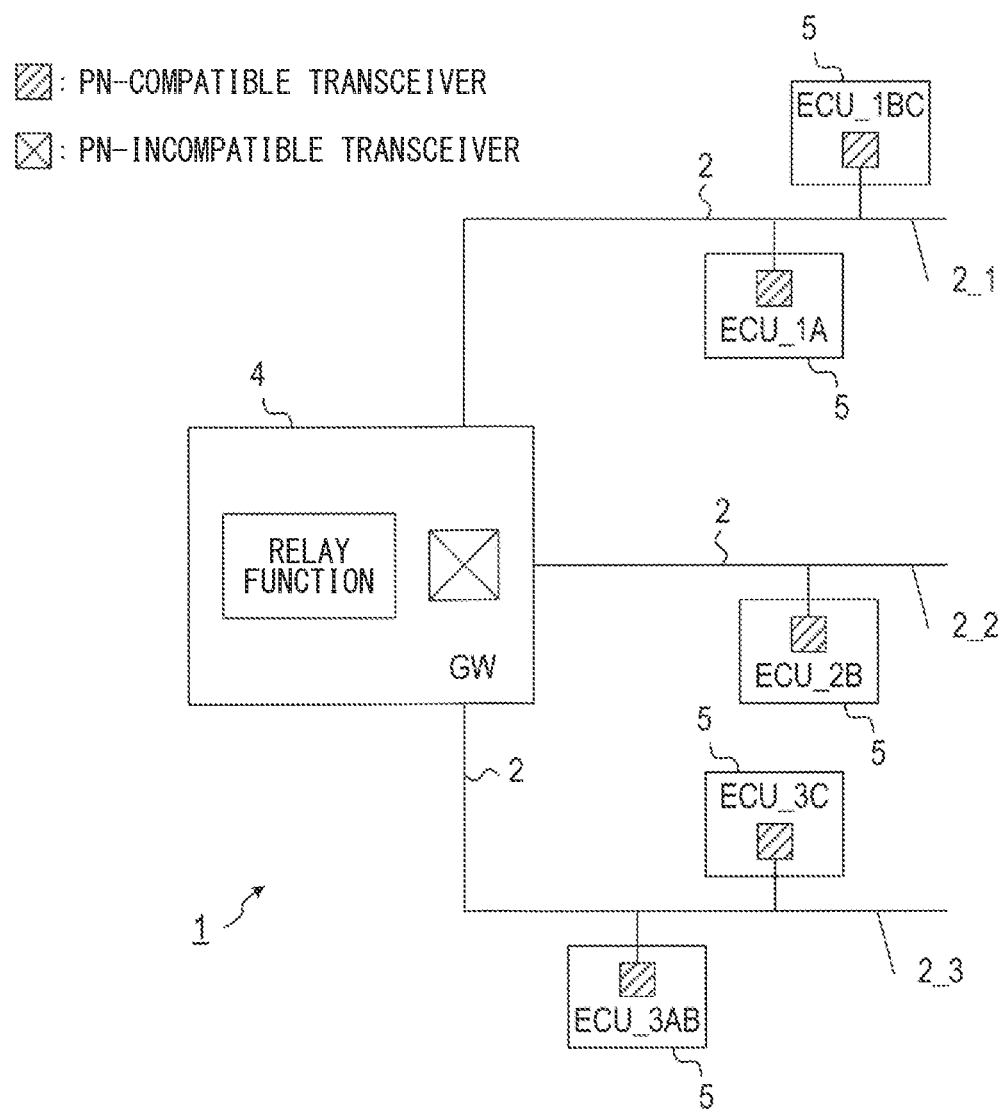
FIG. 1 is a block diagram illustrating the configuration of a network system of a first embodiment.

To begin with, a relevant technology of the present disclosure will be described only for understanding the following embodiments.

As a result of the detailed study by the present inventors, a problem that in the conventional art, power consumption when the ECUs are in the sleep state is desired to be reduced in the partial network has been found out.

One aspect of this disclosure provides a technique for reducing, in a partial network, power consumption when ECUs are in a sleep state.

As described above, according to the one aspect of the present disclosure, a network system including at least one transmission path and a plurality of terminal devices each connected to the transmission path. Each of the terminal devices includes a transceiver, a startup processing unit, and a switching unit. The transceiver includes a first standby unit and a second standby unit and is configured to operate either one of the first standby unit and the second standby unit according to a switching instruction.

The first standby unit is configured to change the terminal device from a sleep state where a designation function is stopped to a wakeup state where the designation function is executable when receiving a designation management frame. The designation management frame is a type of a communication frame transmitted and received through the transmission path and is given at least startup information necessary for identifying a startup group to which the terminal device belongs. The second standby unit is configured to change the terminal device from the sleep state to the wakeup state when receiving any communication frame. The second standby unit is configured to operate with power consumption lower than the first standby unit.

The startup processing unit is configured to: transmit the designation management frame to the transmission path while an internal factor continues when the terminal device wakes up by the internal factor that is a factor other than that of receiving the designation management frame; and not transmit the designation management frame to the transmission path when the internal factor is not generated.

The switching unit is configured to output the switching instruction to the transceiver to operate the second standby unit when a transmission path empty period during which the communication frame is neither transmitted nor received through the transmission path lasts for a predetermined preparation time or more after a non-designation period during which the designation management frame is not received through the transmission path has lasted for a predetermined operation determination time or more.

According to such a configuration, the terminal device is configured to switch the first standby unit and the second standby unit. Thus, power consumption can be reduced, for example, in sleeping, by operating the second standby unit rather than by operating the first standby unit.

In addition, the terminal device operates the second standby unit when the non-designation period is the operation determination time or more and the transmission path empty period continues for the preparation time or more. In other words, the terminal device operates the second standby unit when the terminal devices in the same startup group do not wake up by the internal factor and the transmission path is empty. Thus, when the terminal devices in the same startup group do not wake up and the transmission path is empty, power consumption when the terminal devices sleep can be reduced in the network system.

Next, a plurality of embodiments of the present disclosure will be described below with reference to the drawings.

1. First Embodiment

[1-1. Overall Configuration]

A network system 1 illustrated in FIG. 1 includes at least one bus-like transmission path (hereinafter, a bus 2), and a plurality of terminal devices 5 each connected to the bus 2. For example, in FIG. 1, the network system 1 includes three buses 2, five terminal devices 5, and further, one relay device 4, but the number of buses 2, the number of terminal devices 5, and the number of relay devices 4 of the network system 1 are not limited to these. Also, the network system 1 is not necessarily required to include the relay device 4. Hereinafter, the relay device 4 is also denoted as GW. The GW is an abbreviation for Gateway.

The plurality of buses 2 are connected to each other through the relay device 4 to form a network. Each of the terminal devices 5 is connected to one of the plurality of buses 2. In this embodiment, the terminal device 5 is also collectively called a node.

The network system 1 forms a partial network that is an electric supply control technique on the basis of the communication control of the CAN protocol standard defined in ISO 11898-6: 2013. The CAN is a registered trademark. The partial network achieves low power consumption by waking up (that is, starting up) each node or causing each node to sleep (that is, to hibernate), if necessary. By waking up, the node turns into a normal operation state where a function assigned to the node (hereinafter, also referred to as a designation function) is usable without being limited, and by sleeping, turns into a low power consumption operation state where the usable function is limited.

Figures 2, 3:
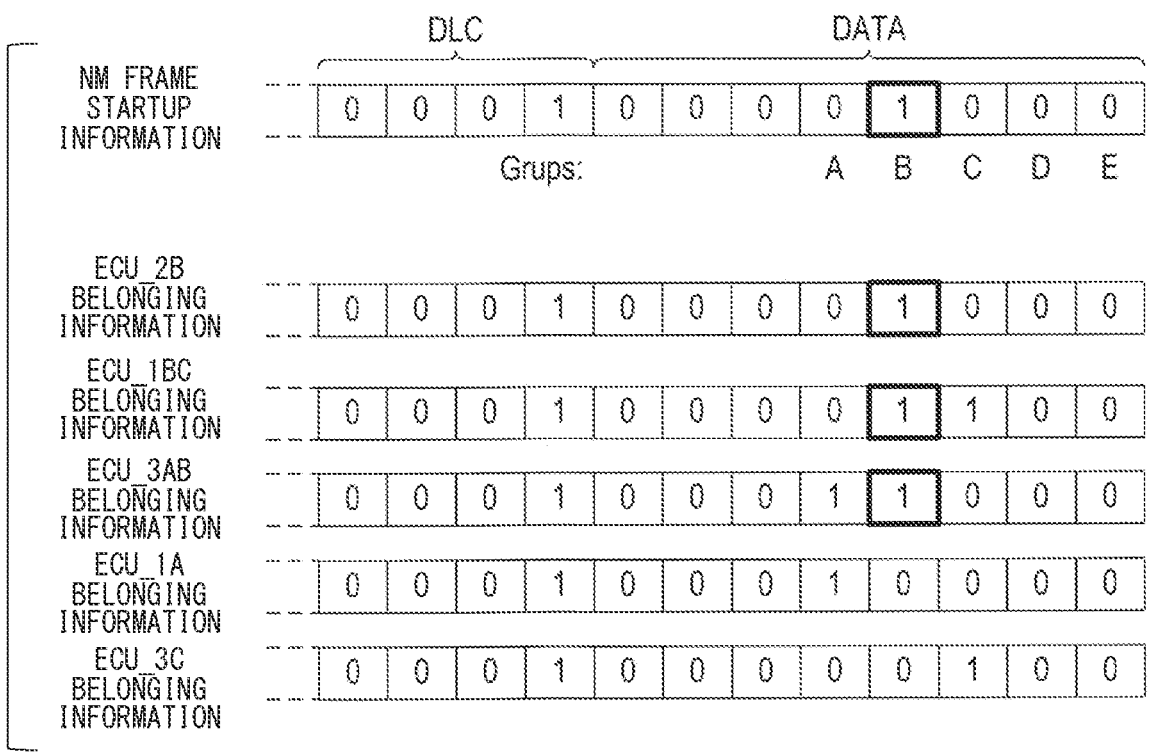
FIG. 2 is an explanatory view illustrating startup groups.
FIG. 3 is an explanatory view illustrating belonging information held by terminal devices and startup information assigned to an NM frame.

In this embodiment, the terminal device 5 is an ECU. The ECU is an abbreviation for Electronic Control Unit. At the time of waking up, the terminal device 5 forms a startup group Grα together with other terminal devices 5 that need to start up at the same time. The startup group includes at least one terminal device 5. An example of the startup groups in this embodiment is illustrated in FIG. 2.

Each of the buses 2 is represented as $2\_i$, and the terminal device 5 connected to the bus $2\_i$ and belonging to the startup group Grα is represented as ECU_iα. The terminal device 5 belonging to a plurality of startup groups is represented as ECU_iαβ . . . . However, i=1, 2, 3, . . . , and α, β=A, B, C, . . . . For example, ECU_1BC means the terminal device 5 connected to the bus $2\_1$ and belonging to two startup groups GrB and GrC.

When waking up the node in the sleep state, the network system 1 uses an NM frame that is a CAN frame including startup information. The startup information is the information for designating the startup group to which each node belongs. The NM is an abbreviation for Network Management. The CAN frame corresponds to a type of a communication frame transmitted and received on the bus 2. Also, the NM frame is a type of the communication frame transmitted and received on the bus 2, and corresponds to a management frame.

The startup information designates at least one terminal device 5. The startup information is set, for example, as illustrated in FIG. 3. DLC is an abbreviation for Data Length Code, and is the region in which the data region size of the CAN frame is represented in bytes. That is, in the NM frame, the startup information is stored in the data region of the CAN frame. Here, for simplifying the description, the case where the DLC has 1 byte (that is, 8 bits) is shown. The startup group is assigned to each bit of the 8-bit data representing the startup information.

For example, in FIG. 3, in the 8-bit data representing the startup information, the high order 3 bits have not been used, and the low order 5 bits represent the ECU startup groups GrA to GrE. However, in the network configuration illustrated in FIG. 1, the GrD and GrE have not been used.

For the startup information set to the NW frame, the bit corresponding to the startup group as a startup target is set to 1. Hereinafter, the bit representing the startup group Grα is sometimes represented as PNC_α. However, α=A, B, C, . . . . For example, in FIG. 3, in the 8-bit data representing the startup information, the fifth bit counted from the low order represents the startup group GrA, and this bit is represented as PNC_A.

That is, in FIG. 3, PNC_A=0, PNC_B=1, PNC_C=0, PNC_D=0, and PNC_E=0. The NM frame illustrated in FIG. 3 is the NM frame for waking up the node belonging to the startup group GrB (that is, the terminal device 5).

[1-1-1. The Configuration of the Relay Device]

Figure 4:
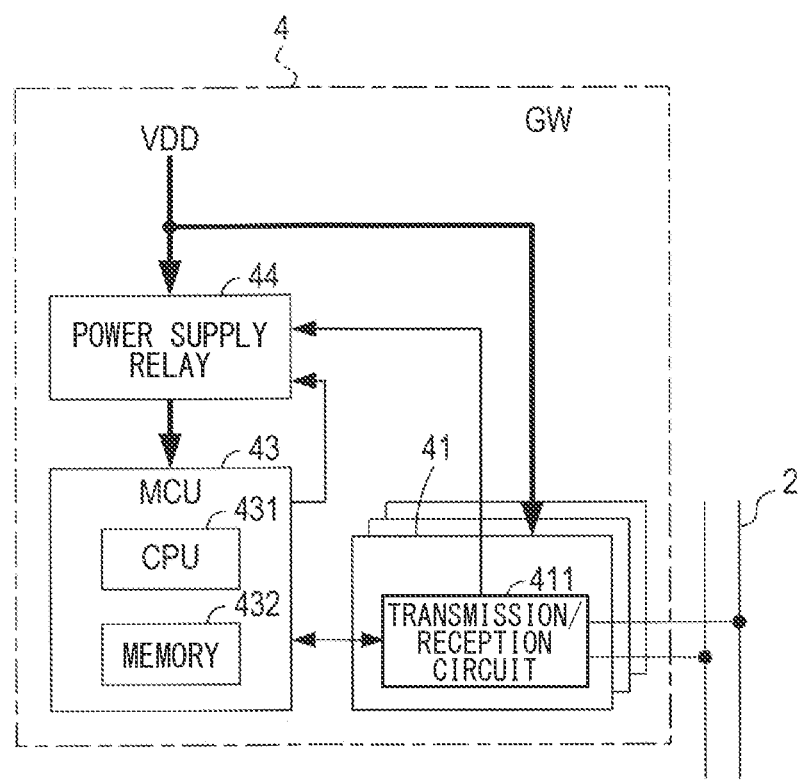
FIG. 4 is a block diagram illustrating the configuration of a relay device.

As illustrated in FIG. 4, the relay device 4 having a relay function is the so-called GW, and includes a transceiver 41, an MCU 43, and a power supply relay 44. The MCU is an abbreviation for Micro Control Unit.

The transceiver 41 always receives electric supply. The MCU 43 receives electric supply through the power supply relay 44. The relay device 4 may include a plurality of transceivers 41 according to the number of the buses 2 connected. For example, in this embodiment, the relay device 4 may include three transceivers 41 according to three buses 2, such as the buses $2\_1$ to $2\_3$.

The transceiver 41 is a transceiver incompatible with the standard of the partial network (hereinafter, a PN-incompatible transceiver), and transmits and receives a signal through the bus 2. The transceiver 41 includes a transmission/reception circuit 411. The transmission/reception circuit 411 generates the communication frame following the CAN protocol according to transmission data supplied from the MCU 43, and transmits the communication frame to the bus 2.

When detecting the reception of any communication frame, the transmission/reception circuit 411 outputs a startup instruction to the power supply relay 44 irrespective of the type and content of the communication frame. Thus, the relay device 4 wakes up. The transmission/reception circuit 411 supplies the communication frame received through the bus 2 to the MCU 43.

The MCU 43 includes a CPU 431, and a semiconductor memory, such as, for example, a ROM or a RAM (hereinafter, a memory 432).

When starting up by starting the electric supply, the MCU 43 at least executes so-called frame relay processing for executing the relay function, although not illustrated.

In this embodiment, further, the MCU 43 executes monitoring startup processing for executing a monitoring function monitoring the empty state of the bus 2 and an all wakeup function waking up all the nodes connected to the buses 2. The memory 432 of the MCU 43 at least stores a program for executing the frame relay processing and the monitoring startup processing.

With the relay function, the relay device 4, when receiving the communication frame, wakes up the MCU 43 irrespective of the type and content of the communication frame, and performs the broadcasting of the received communication frame. The broadcasting means the transmission to all the buses 2 connected to the relay device 4. For example, the relay device 4 transmits the communication frame received from the bus 2_1 to the bus 2_2 to the bus 2_3.

The power supply relay 44 stops the electric supply to the MCU 43 according to a stop instruction (that is, an instruction for turning off the power supply relay 44), and causes the MCU 43 to sleep. Thus, the relay device 4 sleeps. In this embodiment, the stop instruction is outputted in the monitoring startup processing executed by the MCU 43.

[1-1-2. The Configuration of the Terminal Device]

Figure 5:
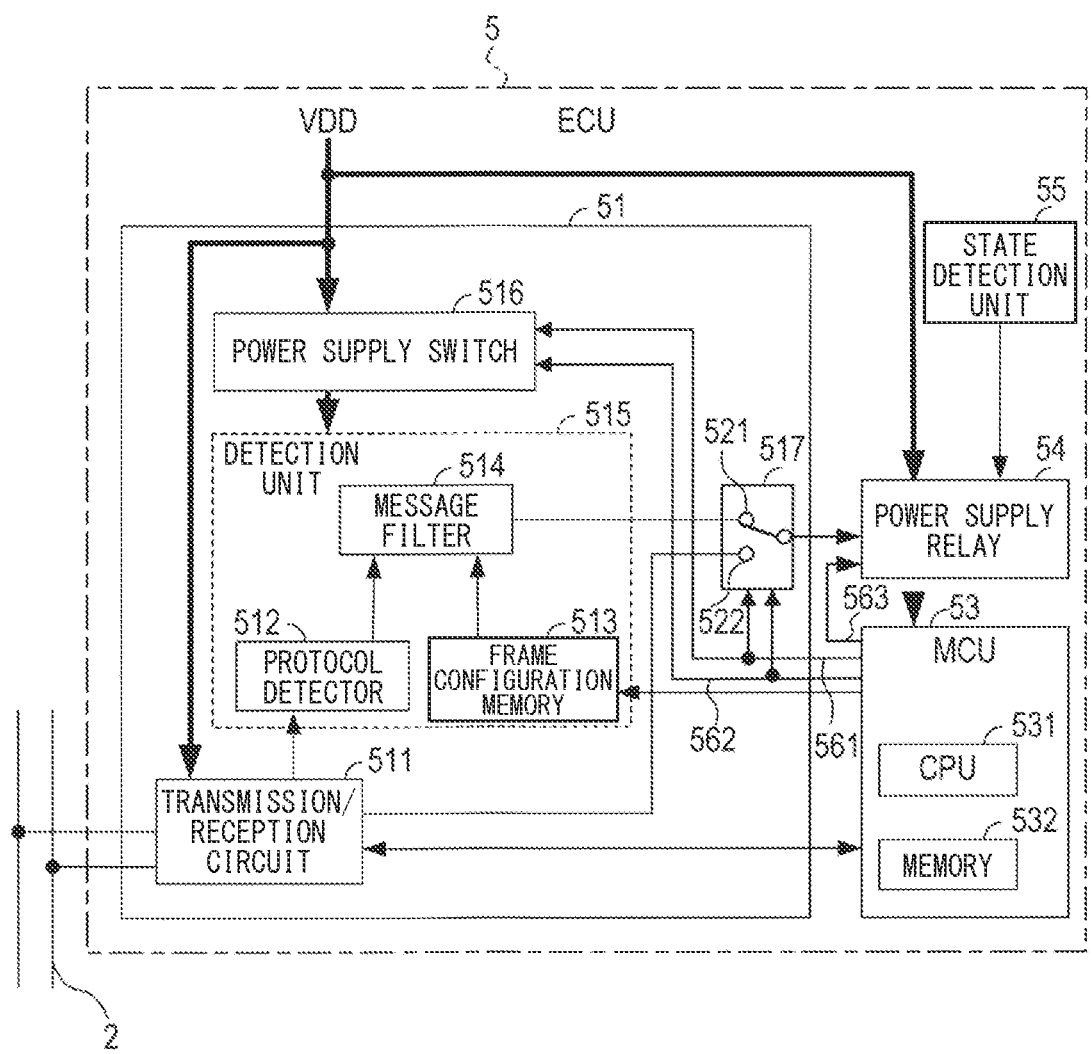
FIG. 5 is a block diagram illustrating the configuration of the terminal device.

As illustrated in FIG. 5, the ECU as the terminal device 5 includes a transceiver 51, an MCU 53, a power supply relay 54, and a state detection unit 55. The MCU 53 receives electric supply through the power supply relay 54.

The transceiver 51 includes a transmission/reception circuit 511, a detection unit 515, a power supply switch 516, and a state discrimination switch 517. The transmission/reception circuit 511, the power supply switch 516, and the state discrimination switch 517 always receive electric supply. The detection unit 515 receives electric supply through the power supply switch 516. The transceiver 51 operates as a PN-compatible transceiver when receiving the electric supply to the detection unit 515 through the power supply switch 516. The transceiver 51 operates as a transceiver incompatible with the standard of the partial network (hereinafter, a PN-incompatible transceiver) when the electric supply to the detection unit 515 stops.

The detection unit 515 is needed in order to operate the transceiver 51 as the PN-compatible transceiver. The detection unit 515 includes a protocol detector 512, a frame configuration memory 513, and a message filter 514.

The transmission/reception circuit 511 has the same function as the transmission/reception circuit 411 that configures the transceiver 41 of the relay device 4 described with reference to FIG. 4. That is, the transmission/reception circuit 511 generates the communication frame following the CAN protocol according to transmission data supplied from the MCU 53, and transmits the communication frame to the bus 2. The transmission/reception circuit 511 supplies the communication frame received through the bus 2 to the MCU 53. In addition, when detecting the reception of the communication frame, the transmission/reception circuit 511 outputs a startup instruction irrespective of the type and content of the communication frame. The startup instruction outputted by the transmission/reception circuit 511 is outputted through the state discrimination switch 517 to the power supply relay 54.

When the communication frame received by the transmission/reception circuit 511 is the NM frame used for the control waking up the node, the protocol detector 512 extracts the startup information shown in the data region of the NM frame, and supplies the startup information to the message filter 514.

The frame configuration memory 513 stores belonging information representing the startup group to which a self-node belongs. The stored content of the frame configuration memory 513 may be configured to be able to be rewritten by the MCU 53. The belonging information has the same data length as the startup information, and has each bit assigned like the startup information. For the belonging information stored in the frame configuration memory 513, the bit corresponding to the startup group to which the self-node belongs is set to 1.

The message filter 514 compares the startup information extracted from the NM frame and the belonging information stored in the frame configuration memory 513, and determines whether or not the startup information includes the information designating the self-node. For example, the startup information and the belonging information are subjected to logical AND operation for each bit, and when the operation result is not zero, it is determined that the startup information includes the information designating the self-node. When determining that the startup information includes the information designating the self-node, the message filter 514 outputs the startup instruction. In this embodiment, the message filter 514 outputs the startup instruction to the state discrimination switch 517.

For example, each of the plurality of terminal devices 5 illustrated in FIG. 1 stores the belonging information illustrated in FIG. 3 in the frame configuration memory 513. For example, as illustrated in FIG. 3, at the reception of the NM frame as PNC_B=1, the message filter 514 of the transceiver 51 of the terminal device 5 belonging to the GrB outputs the startup instruction to the state discrimination switch 517. The terminal devices 5 belonging to the GrB are the ECU_2B, ECU_1BC, and ECU3AB.

The power supply switch 516 executes or stops the electric supply to the detection unit 515 according to a switching instruction from the MCU 53. The switching instruction includes a first switching instruction and a second switching instruction. The first switching instruction is the switching instruction for operating a first standby unit described later. The second switching instruction is the switching instruction for operating a second standby unit described later. In this embodiment, the power supply switch 516 executes the electric supply to the detection unit 515 according to the first switching instruction, and stops the electric supply to the detection unit 515 according to the second switching instruction. Hereinafter, when not discriminated, the first switching instruction and the second switching instruction are simply referred as the switching instructions. The switching instruction is outputted from the MCU 53 through a signal line 561.

In addition, the power supply switch 516 executes the electric supply to the detection unit 515 according to a wakeup instruction from the MCU 53. The wakeup instruction is outputted from the MCU 53 through a signal line 562.

The state discrimination switch 517 switches the transmission source of the startup instruction to the power supply relay 54, to one of the transmission/reception circuit 511 and the detection unit 515 according to the switching instruction from the MCU 53. When the electric supply to the detection unit 515 is executed according to the first switching instruction, the state discrimination switch 517 sets the transmission source of the startup instruction to the power supply relay 54 as the detection unit 515 according to the first switching instruction. When the electric supply to the detection unit 515 is stopped according to the second switching instruction, the state discrimination switch 517 sets the transmission source of the startup instruction to the power supply relay 54 as the transmission/reception circuit 511 according to the second switching instruction.

In this way, the transceiver 51 operates as the PN-compatible transceiver when electricity is supplied to the detection unit 515, and operates as the PN-incompatible transceiver when the electric supply to the detection unit 515 stops. That is, the transceiver 51 is switched to one of the PN-compatible transceiver and the PN-incompatible transceiver according to the switching instruction.

In this embodiment, all the configurations included in the transceiver 51 correspond to the first standby unit, and the configurations excluding the detection unit 515 from all the configurations included in the transceiver 51 correspond to the second standby unit. That is, the second standby unit includes some components of the first standby unit, and operates with power consumption lower than the power consumption of the first standby unit.

In this embodiment, the transceiver 51 supplies electricity to one of the first standby unit and the second standby unit according to the switching instruction. The first standby unit causes the terminal device 5 to make a transition from the sleep state to the wakeup state when receiving the NM frame assigned the startup information designating the terminal device 5 (that is, a designation management frame). The second standby unit causes the terminal device 5 to make a transition from the sleep state to the wakeup state when receiving any communication frame.

In this embodiment, the power supply switch 516 and the state discrimination switch 517 are included in the transceiver 51, but for example, at least one of the power supply switch 516 and the state discrimination switch 517 may be included in the terminal device 5, without being included in the transceiver 51.

Hereinafter, of the sleep states of the terminal device 5, the state where the detection unit 515 receives the electric supply and operates as the PN-compatible transceiver (that is, the state where the first standby unit operates) is also referred to as selective sleep. In addition, of the sleep states of the terminal device 5, the state where the detection unit 515 does not receive the electric supply and operates as the PN-incompatible transceiver (that is, the state where the second standby unit operates) is also referred to as standard sleep.

The state detection unit 55 uses a detection function assigned to the self-node, and determines whether or not the self-node is in the state of being required to wake up. When the self-node is in the state of being required to wake up, the state detection unit 55 outputs the startup instruction (hereinafter, the startup instruction by an internal factor) to the power supply relay 54.

The power supply relay 54 starts the electric supply to the MCU 53 according to the startup instruction from the transceiver 51 or the state detection unit 55, thereby waking up the MCU 53.

The power supply relay 54 notifies a wakeup factor to the MCU 53. The wakeup factor here is one of the startup instruction by the reception of any communication frame or the reception of the NM frame from the transceiver 51 (hereinafter, also referred to as an external factor), and the startup instruction by the internal factor from the state detection unit 55.

Also, the power supply relay 54 stops the electric supply to the MCU 53 according to a stop instruction (that is, an instruction for turning off the power supply relay 54), thereby causing the MCU 53 to sleep. In this embodiment, the stop instruction is outputted through a signal line 563 in startup maintenance processing executed by the MCU 53.

Like the above-described MCU 43, the MCU 53 includes a CPU 531, and a semiconductor memory, such as, for example, a ROM or a RAM (hereinafter, a memory 532).

When starting up by starting the electric supply, the MCU 53 at least executes the startup maintenance processing. In addition, when starting up, the MCU 53 executes processing for executing the function assigned to the self-node (that is, the designation function). The memory 532 of the MCU 53 at least stores the belonging information also stored in the frame configuration memory 513, in addition to a program for executing the startup maintenance processing and the processing for executing the function assigned to the self-node.

[1-2. The Startup Control by the Transceiver]

[1-2-1. The Startup Control by the Transceiver of the Terminal Device]

Figure 6:
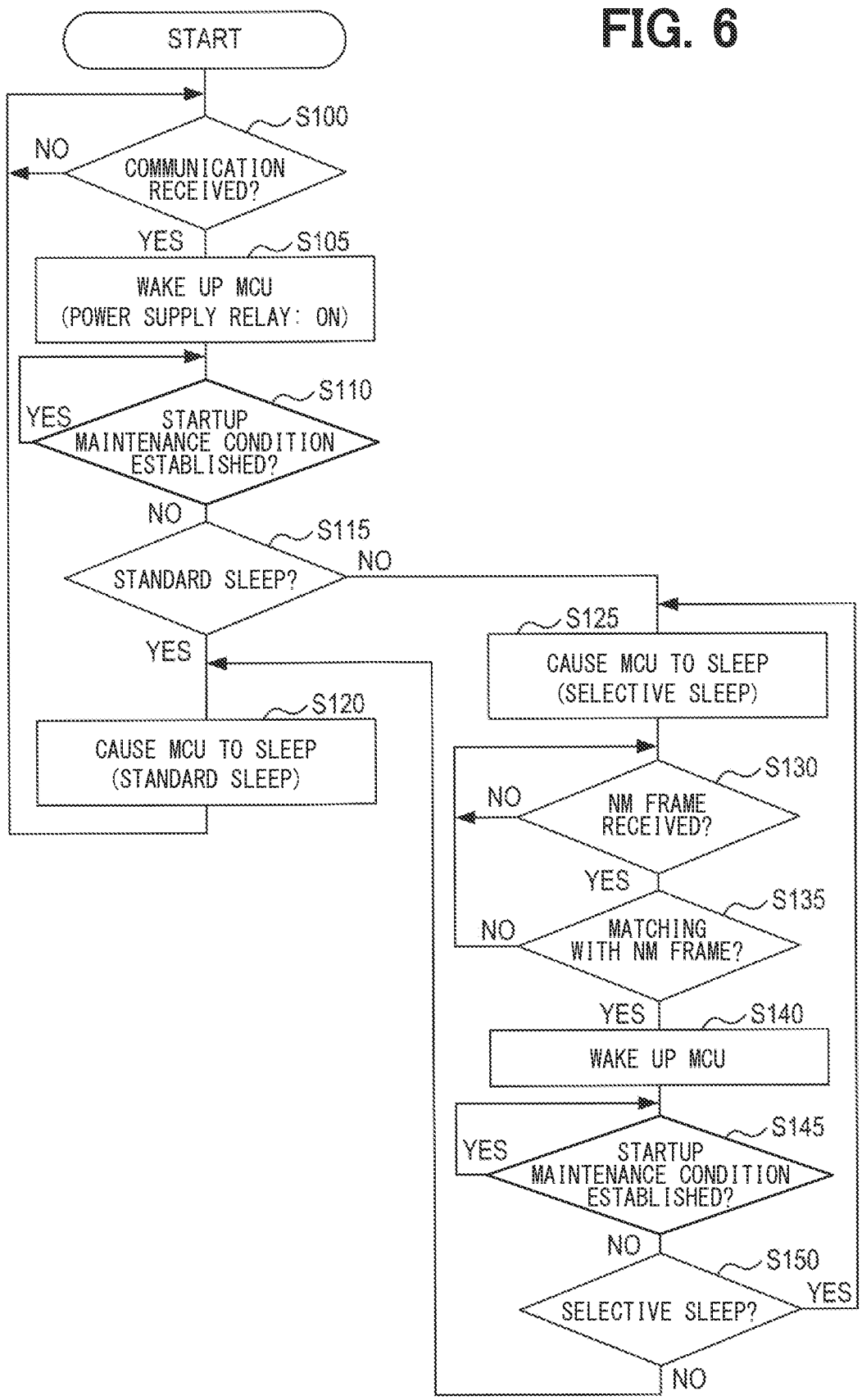
FIG. 6 is a flowchart illustrating the content of startup control executed by a transceiver included in the terminal device.

The content of the startup control executed by the transceiver 51 of each node will be described with reference to the flowchart in FIG. 6. The startup control is continuously executed while the electric supply to the node is performed. In FIG. 6, the transceiver 51 sets the standard sleep as an initial state. That is, the power supply switch 516 stops the electric supply to the detection unit 515 according to the second switching instruction outputted from the MCU 53, and the state discrimination switch 517 selects the transmission/reception circuit 511 as the transmission source of the startup instruction.

However, the transceiver 51 may set the selective sleep as the initial state. When setting the selective sleep as the initial state, the transceiver 51 starts the processing from S125.

In S100, the transceiver 51 determines whether or not the communication frame has been received. The communication frame here is any communication frame. The transceiver 51 is standby by repeating the same step when the communication frame has not been received, and shifts the processing to S105 when the communication frame has been received. The S100 is executed by the transmission/reception circuit 511.

In the S105, the transceiver 51 outputs the startup instruction (that is, the instruction for turning on the power supply relay 54) through the state discrimination switch 517 to the power supply relay 54. The power supply relay 54 that has received the startup instruction starts the electric supply to the MCU 53 to start up the MCU 53. The startup instruction here is outputted from the transmission/reception circuit

511. Thus, the terminal device 5 makes a transition from the sleep state to the wakeup state (that is, wakes up). The power supply switch 516 executes the electric supply to the detection unit 515 according to the wakeup instruction outputted from the MCU 53 that has woken up. Also, the state discrimination switch 517 switches the transmission source of the startup instruction, and selects, as the transmission source of the startup instruction, the detection unit 515, not the transmission/reception circuit 511.

In subsequent S110, the transceiver 51 determines whether or not the startup maintenance condition has been established. The transceiver 51 is standby by repeating the same step when the startup maintenance condition has been established, and shifts the processing to S115 when the startup maintenance condition has not been established.

In the subsequent S115, the transceiver 51 determines whether or not the terminal device 5 is caused to perform the standard sleep. When determining that the terminal device 5 is caused to perform the standard sleep, the transceiver 51 shifts the processing to S120, and causes the terminal device 5 to perform the standard sleep. When determining that the terminal device 5 is not caused to perform the standard sleep (that is, is caused to perform the selective sleep), the transceiver 51 shifts the processing to S125, and causes the terminal device 5 to perform the selective sleep.

For example, in this embodiment, the processing in the S110 to the S115 is executed by the state discrimination switch 517. The processing in the S120 to the S125 are executed by the power supply switch 516.

That is, when not newly receiving the switching instruction from the MCU 53, the state discrimination switch 517 determines that the startup maintenance condition has been established, and holds the switching state to be standby (that is, when it is determined as positive in the S110).

Here, when newly receiving the switching instruction from the MCU 53, the state discrimination switch 517 determines that the startup maintenance condition has not been established, and when the switching instruction is the second switching instruction, the state discrimination switch 517 determines that the terminal device 5 is caused to perform the standard sleep. The state discrimination switch 517 selects the transmission/reception circuit 511 as the transmission source of the startup instruction according to the second switching instruction (that is, when it is determined as positive in the S115).

The power supply switch 516 stops the electric supply to the detection unit 515 according to the above-described second switching instruction, and causes the transceiver 51 to make a transition to the state corresponding to the standard sleep (that is, the PN-incompatible transceiver) (that is, the S120). At this time, the stop instruction is outputted from the MCU 53 to the power supply relay 54. Thus, the terminal device 5 performs the standard sleep.

On the other hand, when newly receiving the switching instruction from the MCU 53, the state discrimination switch 517 determines that the startup maintenance condition has not been established, and when the switching instruction is the first switching instruction, determines that the terminal device 5 is caused to perform the selective sleep. The state discrimination switch 517 selects the detection unit 515 as the transmission source of the startup instruction according to the first switching instruction (that is, when it is determined as negative in the S115). The power supply switch 516 performs the electric supply to the detection unit 515 according to the above-described first switching instruction, and causes the transceiver 51 to make a transition to the state corresponding to the selective sleep (that is, the PN-compatible transceiver) (that is, the S125). At this time, the stop instruction is outputted from the MCU 53 to the power supply relay 54. Thus, the terminal device 5 performs the selective sleep.

In subsequent S130, the transceiver 51 operating as the PN-compatible transceiver determines whether or not the NM frame has been received. This determination is executed by the protocol detector 512. The transceiver 51 is standby by repeating the same step when having not received the NM frame, and shifts the processing to S135 when having received the NM frame.

In the S135, the transceiver 51 determines whether or not the startup group to which the self-node belongs is included in the startup information shown in the data region of the received NM frame, that is, whether or not the self-node is the startup target. This determination is executed by the frame configuration memory 513 and the message filter 514.

The transceiver 51 shifts the processing to S140 when determining that the self-node is the startup target, and returns the processing to the S130 when determining that the self-node is not the startup target.

Like the S105, in the S140, the transceiver 51 starts up the MCU 53. Like the S105, in the transceiver 51, the power supply switch 516 executes the electric supply to the detection unit 515 according to the wakeup instruction outputted from the MCU 53, and the state discrimination switch 517 selects the detection unit 515 as the transmission source of the startup instruction.

In subsequent S145 to S150, the transceiver 51 operates like the S110 to the S115. However, in the S150, the transceiver 51 returns the processing to the S125 when the switching instruction newly received from the MCU is the first switching instruction, and shifts the processing to the S120 when the switching instruction is the second switching instruction.

That is, when the switching instruction is the first switching instruction (that is, when it is determined as positive in the S150), the power supply switch 516 continues the electric supply to the detection unit 515, and causes the transceiver 51 to make a transition to the state corresponding to the selective sleep (that is, the PN-compatible transceiver). Also, when the switching instruction is the second switching instruction (that is, when it is determined as negative in the S150), the power supply switch 516 stops the electric supply to the detection unit 515, and causes the transceiver 51 to make a transition to the state corresponding to the standard sleep (that is, the PN-incompatible transceiver).

[1-2-2. The Startup Control by the Transceiver of the Relay Device]

The content of the startup control executed by the transceiver 41 included in the relay device 4 will be described with reference to the flowchart in FIG. 7. The startup control is executed while the electric supply to the relay device 4 is performed.

In S160 to S165, when receiving the communication frame, the transceiver 41 operating as the PN-incompatible transceiver outputs the startup instruction (that is, the instruction for turning on the power supply relay 44) to the power supply relay 44 irrespective of the type of the communication frame. The power supply relay 44 that has received the startup instruction starts the electric supply to the MCU 43, and starts up the MCU 43. Thus, the relay device 4 wakes up. The relay device 4 executes the relay function while waking up.

In S170, the transceiver 41 determines whether or not the startup maintenance condition has been established, is standby by repeating the same step when the startup maintenance condition has been established, and shifts the processing to the S175 when the startup maintenance condition has not been established. In this embodiment, the transceiver 41 determines that the startup maintenance condition has been established, when not receiving the stop instruction from the MCU 43, and determines that the startup maintenance condition has not been established to shift the processing to the S175, when receiving the stop instruction from the MCU 43.

In the S175, the transceiver 41 outputs the stop instruction to the power supply relay 44. Thus, the electric supply to the MCU 43 stops, and the relay device 4 sleeps (that is, performs the standard sleep).

[1-3. Processing]

[1-3-1. The Startup Maintenance Processing by the Terminal Device]

The content of the startup maintenance processing executed by the terminal device 5 will be described below with reference to the flowchart in FIG. 8. In this embodiment, in the processing described below, the processing in S200 is executed by the transceiver 51, and the processing after S210 is executed by the MCU 53. The terminal device 5 can be configured as appropriate so that at least part of the processing executed by the MCU 53 is executed by the hardware.

In the S200, when the terminal device 5 is in the sleep state, the transceiver 51 wakes up the terminal device 5 when the communication frame waking up the self-node is present on the bus 2.

Like the S100 or the S130 to the S135 illustrated in FIG. 6, the transceiver 51 determines whether or not the communication frame waking up the self-node is present on the bus 2. The communication frame here is any communication frame when the terminal device 5 performs the standard sleep, and is the NM frame assigned the startup information designating the self-node when the terminal device 5 performs the selective sleep. Hereinafter, the NM frame assigned the startup information designating the self-node is also referred to as a designation NM frame. In other words, the startup information designating the self-node is the startup information designating the startup group including the terminal device 5. The designation NM frame corresponds to the designation management frame.

The terminal device 5 wakes up also when the state where the network system 1 should be started up (that is, the internal factor) is detected by the state detection unit 55. In the terminal device 5, the information representing which of the reception of the designation NM frame (that is, the external factor) and the internal factor is the wakeup factor is notified from the power supply relay 54 to the MCU 53, as described above. Among the wakeup factors, the factor other than the reception of the designation NM frame corresponds to the internal factor.

In the S210, when waking up, the MCU 53 outputs the wakeup instruction through the signal line 562 to the power supply switch 516 and the state discrimination switch 517. The wakeup instruction is the instruction that causes the power supply switch 516 to execute the electric supply to the detection unit 515 and causes the state discrimination switch 517 to select the detection unit 515 as the transmission source of the startup instruction. Thus, the MCU 53 operates the transceiver 51 as the PN-compatible transceiver. That is, the terminal device 5 operates so as to be compatible with the partial network.

In the subsequent S220, the MCU 53 determines, on the basis of the information notified from the power supply relay 54, whether or not the wakeup factor is the startup factor caused by the self-node (that is, the internal factor). When determining that the wakeup factor is the internal factor, the MCU 53 shifts the processing to the S230. When determining that the wakeup factor is not the internal factor and is the reception of the designation NM frame, (that is, the external factor), the MCU 53 shifts the processing to the S240.

In the S230, the MCU 53 transmits the NM frame assigned, as the startup information, the information required for identifying the startup group to which the terminal device 5 belongs, (that is, the designation NM frame) to the bus 2, and returns the processing to the S220. That is, the MCU 53 repeatedly (that is, periodically) transmits the designation NM frame to the bus 2 while the wakeup factor is the internal factor. When the wakeup factor is no longer the internal factor (that is, when the detection of the internal factor by the state detection unit 55 stops), the MCU 53 stops the periodical transmission of the designation NM frame to the bus 2, and shifts the processing to the S240.

While waking up, the MCU 53 can transmit a typical frame that is each of various communication frames other than the designation NM frame, to the buses 2 in order to execute the function previously assigned to the self-node. The typical frame can be transmitted while the MCU 53 transmits the designation NM frame in the S230 (that is, while the terminal device 5 wakes up by the internal factor). The typical frame can be received and used by other nodes in the startup group to which the self-node belongs.

Hereinafter, the startup group to which the self-node belongs is also referred to as the same startup group. Also, other nodes in the startup group to which the self-node belongs are also referred to as other nodes in the same startup group. That is, the MCU 53 can receive, from the buses 2, the typical frames transmitted by other nodes in the same startup group. The MCU 53 may be configured so as not to transmit the typical frame.

In the S240, the MCU 53 determines whether or not a non-designation period is operation determination time or more. The non-designation period is the period during which the NM frame designating the self-node as a reception target (that is, the designation NM frame) is absent on the bus 2 (that is, the period during which the designation NM frame is not received through the bus 2). The operation determination time is the predetermined time for detecting that all other nodes in the same startup group have not started up by the internal factor, and is the time for determining whether or not the self-node may be caused to sleep.

The operation determination time is set to the time longer than the transmission cycle of the designation NM frame. The operation determination time can be set to, for example, three seconds. However, the operation determination time is not limited to this, and can be arbitrarily set.

Although not illustrated, by timer processing that is the processing different from this startup maintenance processing, the MCU 53 measures, as the non-designation period, the time from the reception of the designation NM frame to the reception of the next designation NM frame. In the timer processing, the non-designation period is reset each time the designation NM frame is received, and is reset after this startup control processing ends.

The MCU 53 determines, on the basis of the timer processing, whether or not the non-designation period is the operation determination time or more. The MCU 53 returns the processing to the S220 when the non-designation period is less than the operation determination time, and shifts the processing to the S250 when the non-designation period is the operation determination time or more.

It is determined as positive in the S240, which means that all other nodes in the same startup group have not also started up by the internal factor for the operation determination time or more, and that like the S250 described later, all other nodes in the same startup group can also stop the transmission of the typical frames.

In the S250, the MCU 53 stops the transmission of all the communication frames to the buses 2. All the communication frames are the communication frames other than the designation NM frames in which the transmission thereof has already been stopped (hereinafter, the typical frames). When the transmission is stopped, the communication frames caused by the self-node (that is, the designation NM frames and the typical frames transmitted by the internal factor) are not received by all the nodes in the same startup group.

Other nodes in the same startup group are configured to execute the startup maintenance processing like the self-node. The self-node determines as positive in the S240 to shift to the S250, which means that other nodes in the same startup group also performs similar determination at substantially the same timing, and shift to the S250. That is, other nodes in the same startup group stop the transmission of the designation NM frames and the typical frames on the basis of the internal factor of the node at substantially the same timing.

Thus, the transmission and reception of the communication frames between all the nodes in the same startup group stop. However, the "same timing" here is not limited to the "same timing" in strict meaning. This is because deviation (that is, an error) can be caused between the self-node and other nodes in the same startup group in detecting the timings.

In the subsequent S260, the MCU 53 is standby for predetermined spare time. The spare time can be set to, for example, three seconds. However, the spare time is not limited to this, and can be arbitrarily set.

The spare time is the time for inhibiting the influence due to the caused deviation between the timing at which it is determined by the self-node that the non-designation period is the operation determination time or more and the timing at which it is determined by other nodes in the same startup group that the non-designation period is the operation determination time or more. The influence due to the caused deviation means that after it is determined by the self-node that the non-designation period is the operation determination time or more, the typical frames from other nodes in the same startup group are received by the self-node through the buses 2.

During the spare time, the terminal device 5 can receive the typical frames transmitted from other nodes in the same startup group, but the typical frames received during the spare time may be used by the terminal device 5, or are not necessarily required to be used.

In the subsequent S270, after the non-designation period continues for the operation determination time, and after further, the spare time elapses, the MCU 53 measures a transmission path empty period, and determines whether or not the transmission path empty period continues for predetermined transition determination time or more. The transmission path empty period is the period during which the communication frame is absent on the bus 2, in other words, the period during which any communication frame is not transmitted and received on the bus 2 (that is, the period during which the bus 2 is empty).

The MCU 53 measures the transmission path empty period by the processing different from this startup maintenance processing, for example, by the timer processing by which the measurement time is reset each time the certain communication frame is received or at the time of the completion of this startup maintenance control.

The transition determination time can be set to, for example, three seconds. However, the transition determination time is not limited to this, and can be arbitrarily set. The transition determination time is the time to monitor the empty state of the bus 2 in order to decide in which of the standard sleep state and the selective sleep state the self-node is caused to sleep. The MCU 53 shifts the processing to the S280 when the transmission path empty period is less than the transition determination time, and shifts the processing to the S290 when the transmission path empty period is the transition determination time or more.

In the S280, the MCU 53 causes the self-node to make a transition from the wakeup state to the selective sleep state (that is, causes the self-node to perform the selective sleep). Specifically, the MCU 53 outputs the first switching instruction to the power supply switch 516 and the state discrimination switch 517, and outputs the stop instruction to the power supply relay 54. Thus, the MCU 53 ends this startup control processing.

Thus, by stopping the electric supply to the MCU 53, the self-node sleeps. Also, electricity is supplied to the detection unit 515 by the power supply switch 516, and the detection unit 515 is selected as the transmission source of the startup instruction by the state discrimination switch 517, so that the transceiver 51 operates as the PN-compatible transceiver. As a result, in sleeping, the self-node makes a transition to the selective sleep.

In the S290, the MCU 53 causes the self-node to make a transition from the wakeup state to the standard sleep state (that is, causes the self-node to perform the standard sleep). Specifically, the MCU 53 outputs the second switching instruction to the power supply switch 516 and the state discrimination switch 517, and outputs the stop instruction to the power supply relay 54. Thus, the MCU 53 ends this startup control processing.

Thus, by stopping the electric supply to the MCU 53, the self-node sleeps. Also, the electric supply to the detection unit 515 is stopped by the power supply switch 516, and the transmission/reception circuit 511 is selected as the transmission source of the startup instruction by the state discrimination switch 517, so that the transceiver 51 operates as the PN-incompatible transceiver. As a result, in sleeping, the self-node makes a transition to the standard sleep.

[1-3-2. The Monitoring Startup Processing by the Relay Device]

The content of the monitoring startup processing executed by the relay device 4 will be described below with reference to the flowchart in FIG. 9. In this embodiment, in the processing described below, the processing in S300 is executed by the transceiver 41, and the processing after S310 is executed by the MCU 43. The relay device 4 can be configured as appropriate so that at least part of the processing executed by the MCU 43 is executed by the hardware.

Figure 7:
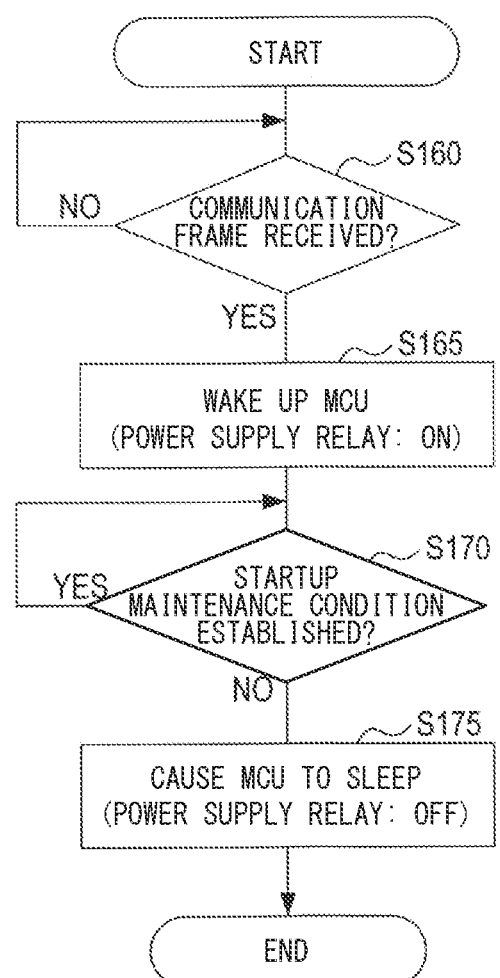
FIG. 7 is a flowchart illustrating the content of startup control executed by a transceiver included in the relay device.

In the S300, when the relay device 4 is in the sleep state, like the S160 illustrated in FIG. 7, the transceiver 41 determines whether or not the communication frame waking up the relay device 4 is present on the bus 2. The communication frame here is any communication frame. When any communication frame is present on the bus 2, the transceiver 41 wakes up the relay device 4.

In the S310, after waking up, the MCU 43 continuously executes the frame relay processing as the processing different from this monitoring startup processing while waking up.

In the subsequent S320, the MCU 43 determines whether or not the period during which any communication frame is not transmitted and received on the bus 2 (that is, the above-described transmission path empty period) continues for predetermined monitoring time or more. The MCU 43 measures the transmission path empty period by the processing different from this monitoring startup processing, for example, by the timer processing by which the measurement time is reset each time the certain communication frame is received or at the time of the completion of this monitoring startup processing.

The monitoring time is the time for determining the timing at which a particular startup frame is outputted to the bus 2. The monitoring time is set to the value larger than a preparation time. The preparation time corresponds to the time obtained by adding the spare time and the transition determination time described above.

The MCU 43 is standby by repeating the same step when the transmission path empty period is less than the monitoring time, and shifts the processing to the S330 when the transmission path empty period is the monitoring time or more.

In the S330, the MCU 43 transmits the particular startup frames to all the nodes connected to the buses 2 excluding the relay device 4. The particular startup frame is a type of the communication frame, and is the communication frame for waking up all the nodes connected to the buses 2 excluding the relay device 4 (that is, all the terminal devices 5 connected to the buses 2).

The particular startup frame may be the communication frame that has an unused bit of the 8-bit data representing the startup information and such that 1 is set to the predetermined bit. For example, in FIG. 3, in the 8-bit data representing the startup information, the sixth bit counted from the low order may be used as the bit representing the particular startup frame. Also for the belonging information stored by each terminal device 5, the same bit as the bit representing the particular startup frame in the startup information is assigned as the bit representing the particular startup frame.

Thus, both the terminal device 5 performing the standard sleep and the terminal device 5 performing the selective sleep wake up by receiving the particular startup frame. The particular startup frame is not limited to this, and can be configured in various forms.

The terminal device 5 that has woken up by the particular startup frame, after having woken up by the particular startup frame, makes a transition to the standard sleep when detecting that the non-designation period continues for the operation determination time or more and that the transmission path empty period continues for the preparation time or more. In other words, when after the transmission of the particular startup frame, the transmission path empty period successively continues for the operation determination time or more and the preparation time or more, all the terminal devices 5 make a transition to the standard sleep.

In the S340, the MCU 43 is standby for predetermined re-startup time. In this embodiment, the re-startup time is set to the value larger than the time obtained by adding the operation determination time and the preparation time described above. The re-startup time may be 0.

In the S350, the MCU 43 outputs the stop instruction to the power supply relay 44. Thus, the electric supply to the MCU 43 stops, and the relay device 4 sleeps. The transceiver 41 included in the relay device 4 is the PN-incompatible transceiver, so that in sleeping, the relay device 4 performs the standard sleep. That is, the relay device 4 performs the standard sleep, so that all the nodes of the network system 1 perform the standard sleep.

[1-4. Operation]

[1-4-1. The Operation of the Terminal Device]

Figure 10:
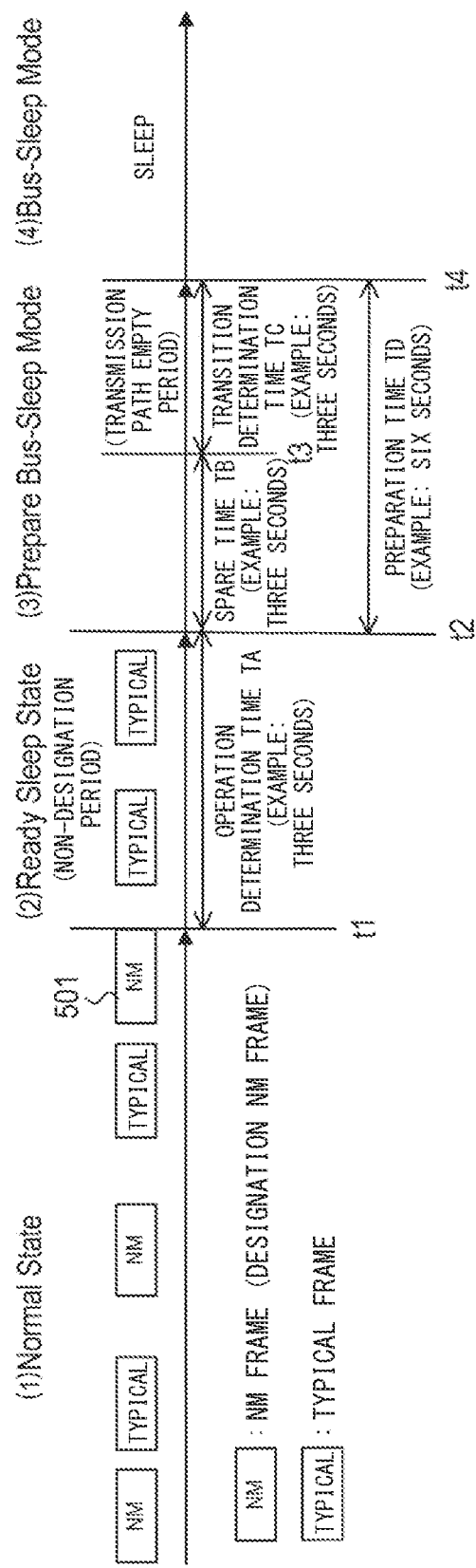
FIG. 10 is an explanatory view explaining the operation of the terminal device.

The operation of the terminal device 5 (that is, the self-node) will be described with reference to FIG. 10. In FIG. 10, the operation determination time is represented as TA, the spare time is represented as TB, the transition determination time is represented as TC, and the preparation time is represented as TD. FIG. 10 illustrates the state where a designation NM frame 501 is transmitted and received on the bus 2 at time t1, the operation determination time TA or more elapses, and successively, the designation NM frame is not transmitted and received on the bus 2. The time at which the operation determination time TA elapses from the time t1 at which the designation NM frame 501 is transmitted and received on the bus 2 is time t2. The time at which the spare time TB elapses from the time t2 is time t3. The time at which the transition determination time TC elapses from the time t3 is time t4.

The designation NM frames and the typical frames that are illustrated are the communication frames to be received by the nodes in the same startup group. The transmission source may be the self-node, or may be other nodes in the same startup group.

Only the typical frames can be transmitted and received on the bus 2 from the time t1 at which the self-node detects the designation NM frame most recently, to the time t2 at which the period during which the reception of the designation NM frame is not detected (that is, the non-designation period) continues for the operation determination time TA.

At the time t2, the self-node stops the transmission of all the communication frames. At substantially the same timing as the time t2, the transmission of all the communication frames is similarly stopped in other nodes in the same startup group. With allowance, the self-node determines in which of the states the self-node is caused to sleep, according to the state of the bus 2 after the time t3 that is the time at which the spare time TB elapses from the time t2.

The period to monitor the empty state of the bus 2 is from the time t3 to the time t4 at which the transition determination time TC elapses, in order to determine in which of the states the self-node is caused to sleep. Here, when the bus 2 is not in the empty state from the time t3 to the time t4 at which the transition determination time TC elapses, the self-node makes a transition to the selective sleep after the time t4. The bus 2 is not in the empty state, which means that any communication frame is transmitted and received on the bus 2. On the other hand, when the bus 2 is in the empty state during this time, the self-node makes a transition to the standard sleep after the time t4.

[1-4-2. The Operation of the Network System]

Figure 11:
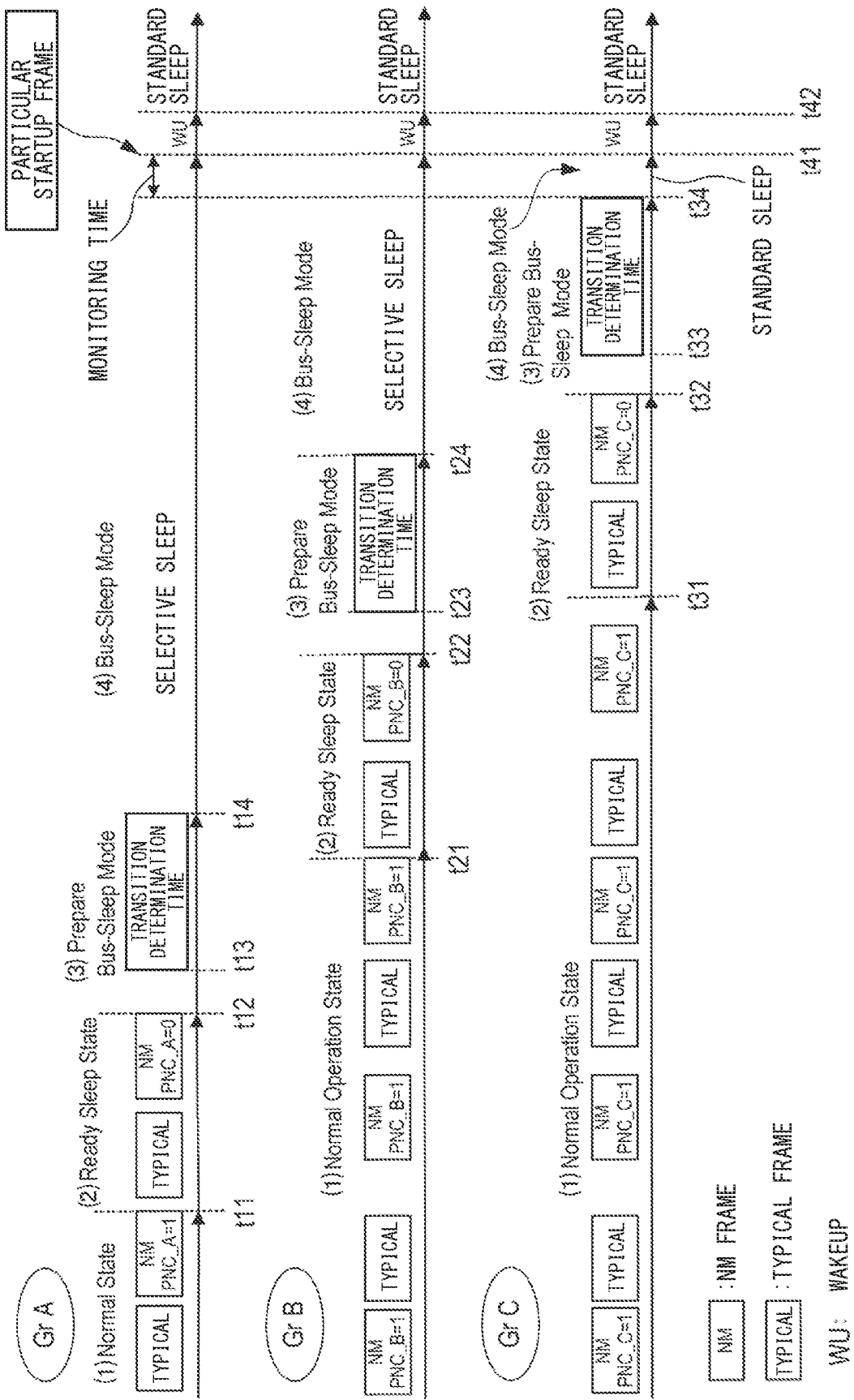
FIG. 11 is an explanatory view explaining the operation of the network system.

The operation of the network system 1 will be described with reference to FIG. 11. Like FIG. 10, FIG. 11 illustrates the operation of the terminal devices 5. However, FIG. 11 illustrates the operation of each of the terminal devices 5 belonging to the startup groups GrA, GrB, and GrC. The NM frame including the startup information designating the startup group α is represented as "NM PNC_α=1", and the NM frame not including the startup information designating the startup group a is represented as "NM PNC_α=0". However, α=A, B, C, . . . .

For example, NM PNC_A=1 is the NM frame including the startup information designating the startup group GrA, and in other words, is the designation NM frame with respect to the terminal device 5 belonging to the startup group GrA.

The terminal device 5 belonging to the startup group GrA operates like FIG. 10. Here, t11, t12, t13, and t14 correspond to the t1, t2, t3, and t4 in FIG. 10, respectively. In FIG. 11, the communication frame is transmitted and received on the bus 2 between the time t13 and the time t14, so that the terminal device 5 belonging to the startup group GrA makes a transition to the selective sleep after the time t14. The communication frames transmitted and received on the bus 2 here are, for example, "NM PNC B=1" and "NM PNC_C=1" in FIG. 11.

The terminal device 5 belonging to the startup group GrB also operates like FIG. 10. Here, t21, t22, t23, and t24 correspond to the t1, t2, t3, and t4 in FIG. 10, respectively. In FIG. 11, the communication frame is transmitted and received on the bus 2 between the time t23 and the time t24, so that the terminal device 5 belonging to the startup group GrB makes a transition to the selective sleep after the time t24. The communication frames transmitted and received on the bus 2 here are, for example, the typical frame and "NM PNC_C=0" in FIG. 11.

The terminal device 5 belonging to the startup group GrC also operates almost similarly to FIG. 10. Here, t31, t32, t33, and t34 correspond to the t1, t2, t3, and t4 in FIG. 10, respectively. However, in FIG. 11, the bus 2 is in the empty state between the time t33 and the time t34, so that the terminal device 5 belonging to the startup group GrC makes a transition to the standard sleep after the time t34.

In other words, in the network system 1, among the plurality of terminal devices 5 connected to the buses 2, the terminal device 5 sleeping last performs the standard sleep. Thus, in the network system 1, at least the terminal device 5 sleeping last performs the standard sleep, so that power consumption in the sleep state is reduced. That is, in the network system 1, power consumption is reduced corresponding to at least the terminal device 5 sleeping last.

In the network system 1 of this embodiment, the relay device 4 measures the transmission path empty period like the terminal device 5, and outputs the particular startup frame when the transmission path empty period continues for the monitoring time or more. For example, the bus 2 is in the empty state after the time t34 in FIG. 11, so that the relay device 4 outputs the particular startup frame at the time t41 at which the monitoring time elapses from the time t34. Thus, in the network system 1, all the terminal devices 5 that are all the nodes wake up.

At the time t41, each of all the terminal devices 5 that have woken up by the particular startup frame executes the above-described startup maintenance processing, and makes a transition to the standard sleep since the bus 2 is in the empty state. In FIG. 11, all the terminal devices 5 in the startup groups GrA to GrC make a transition to the standard sleep after the time t42. However, deviation can be caused between the timings at which the respective terminal devices 5 make a transition to the standard sleep. Further, after the time t41 at which the particular startup frame is transmitted, the relay device 4 sleeps after being standby for the re-startup time.

In this way, in the network system 1, when the empty state of the buses 2 continues, all the terminal devices 5 that are all the nodes connected to the buses 2 make a transition to the standard sleep. Thus, in the network system 1 that is the partial network, power consumption when the terminal devices 5 are in the sleep state is reduced.

Further, in the network system 1, after all the terminal devices 5 make a transition to the standard sleep by the reception of the particular startup frame, the relay device 4 also makes a transition to the standard sleep. Thus, all the nodes and the relay device 4 of the network system 1 perform the standard sleep, and power consumption when the terminal devices 5 are in the sleep state is further reduced in the network system 1.

[1-5. Effects]

According to the first embodiment described above in detail, the following effects are exerted.

(1a) In the terminal device 5 included in the network system 1, the transceiver 51 has the first standby unit and the second standby unit. The first standby unit receives the designation NM frame, and then causes the terminal device 5 to make a transition from the sleep state to the wakeup state. The second standby unit receives any communication frame, and then causes the terminal device 5 to make a transition from the sleep state to the wakeup state.

The transceiver 51 operates one of the first standby unit and the second standby unit according to the switching instruction. The transceiver 51 operates as the PN-compatible transceiver causing the terminal device 5 to make a transition to the selective sleep at the time of the operation of the first standby unit, and operates the terminal device 5 as the PN-incompatible transceiver causing the terminal device 5 to make a transition to the standard sleep at the time of the operation of the second standby unit.

Since the second standby unit includes some configurations included in the first standby unit, power consumption is lower in the case of using the transceiver 51 as the PN-incompatible transceiver by operating the second standby unit than in the case of using the transceiver 51 as the PN-compatible transceiver by operating the first standby unit.

In the MCU 53 of the terminal device 5, when the terminal device 5 wakes up by the internal factor, a startup processing unit periodically transmits the designation NM frame to the bus while the internal factor continues, and does not transmit the designation NM frame to the bus 2 when the internal factor is not caused. The S220 to the S230 correspond to the processing as the startup processing unit. That is, the terminal device 5 starting up by the internal factor can wake up the terminal devices 5 included in the same startup group while the designation NM frame is transmitted.

In other words, when the terminal device 5 starting up by the internal factor stops the transmission of the designation NM frame, the continuous wake-up of the terminal devices 5 included in the same startup group are also stopped by the reception of the designation NM frame.

In the MCU 53, after the non-designation period during which the designation NM frame is not received through the bus 2 becomes the operation determination time or more, a switching unit determines whether or not the transmission path empty period continues for the preparation time or more. The MCU 53 outputs, to the transceiver 51, the second switching instruction that is the switching instruction operating the second standby unit when the transmission path empty period continues for the preparation time or more. In this embodiment, the time obtained by adding the spare time and the transition determination time corresponds to the preparation time. The S240 to the S290 correspond to the processing as the switching unit.

According to such a configuration, the terminal device 5 is configured so as to be able to switch the first standby unit and the second standby unit. Thus, power consumption can be reduced, for example, in sleeping, by operating the second standby unit rather than by operating the first standby unit.

Further, when the non-designation period becomes the operation determination time or more, and the transmission path empty period continues for the preparation time or more, the terminal device 5 operates the second standby unit in sleeping. In other words, the terminal device 5 makes a transition to the standard sleep when other terminal devices 5 in the same startup group do not wake up by the internal factor, the terminal device 5 is brought into the state where the terminal device 5 may cause to sleep, and the state where the bus 2 is empty then continues. As a result, in the network system 1, power consumption can be reduced corresponding to the standard sleep performed by the terminal device 5.

For example, when electricity is not supplied for a long period to the vehicle equipped with the network system 1 (that is, more specifically, the terminal device 5), the effect of reducing power consumption is further exerted. The long period here can include various periods, such as, for example, the period during which the vehicle is parked, and the period during which the vehicle is transported.

(1b) The MCU 53 measures the non-designation period. In the MCU 53, an empty period determination unit, after the non-designation period becomes the operation determination time or more, determines whether or not the transmission path empty period is the preparation time or more. The S240 corresponds to the processing as an empty period determination unit. In the MCU 53, a first switching execution unit outputs the first switching instruction to the transceiver 51 when after the non-designation period continues for the operation determination time or more, it is determined that the transmission path empty period is less than the preparation time. The S280 corresponds to the processing as the first switching execution unit. The first switching instruction is the switching instruction for operating the first standby unit.

In the S290, the MCU 53 outputs the second switching instruction to the transceiver 51 when after the non-designation period continues for the operation determination time or more, it is determined that the transmission path empty period is the preparation time or more. The S290 corresponds to the processing as a second switching execution unit.

According to such a configuration, the terminal device 5 makes a transition to the selective sleep. Thus, the network system 1 can be successively operated as the partial network system by using the terminal device 5.

(1c) The network system 1 includes the relay device 4. The MCU 43 of the relay device 4 includes a monitoring startup unit. The monitoring startup unit measures the transmission path empty period. The monitoring startup unit transmits the particular startup frame when the predetermined condition in which the transmission path empty period continues for the monitoring time or more longer than the above-described preparation time is satisfied. S440 corresponds to the processing as the monitoring startup unit. The particular startup frame is a type of the communication frame, and is the communication frame for waking up all the nodes. In this embodiment, the relay device 4 is not included in each of all the nodes here.

According to such a configuration, even if the terminal device 5 performing the selective sleep and the terminal device 5 performing the standard sleep are mixed in the network system 1, all the terminal devices 5 can be woken up by the particular startup frame.

(1d) The first standby unit and the second standby unit of the terminal device 5 causes the terminal device 5 to make a transition from the sleep state to the wakeup state by the reception of the particular startup frame. When making a transition to the wakeup state by the reception of the particular startup frame, the terminal device 5 outputs the second switching instruction to the transceiver 51 when the non-designation period becomes the operation determination time or more, and it is determined that the transmission path empty period is the preparation time or more.

According to such a configuration, each of all the terminal devices 5 that have received the particular startup frame and made a transition to the wakeup state makes a transition to the standard sleep when the transmission path is continuously empty after the reception of the particular startup frame. That is, all the terminal devices 5 of the network system 1 perform the standard sleep, so that in the network system 1, power consumption when the terminal devices 5 are in the sleep state can be further reduced.

(1e) The relay device 4 determines whether or not, after the transmission of the particular startup frame, the transmission path empty period successively continues for the re-startup time or more larger than the value obtained by adding the operation determination time and the preparation time, and when the transmission path empty period successively continues for the re-startup time or more, makes a transition to the standard sleep. Since the re-startup time is larger than the value obtained by adding the operation determination time and the preparation time, the relay device 4 can perform the standard sleep after all the terminal devices 5 that have woken up by the reception of the particular startup frame perform the standard sleep.

According to such a configuration, the relay device 4 and all the nodes perform the standard sleep in the network system 1. Thus, power consumption when the terminal devices 5 are in the sleep state can be further reduced in the network system 1.

2. Second Embodiment

[2-1. The Point Different from the First Embodiment]

The second embodiment has the same basic configuration as the first embodiment, and thus, the different point will be described below. The same reference numerals as the first embodiment denote the same configurations, and the previous description is referred. This is ditto for a third embodiment or later.

In the above-described first embodiment, the relay device 4 has the monitoring function and the all wakeup function. On the other hand, the second embodiment is different from the first embodiment in that in place of the relay device 4, the terminal device 5 includes the monitoring function and the all wakeup function.

Figure 12:
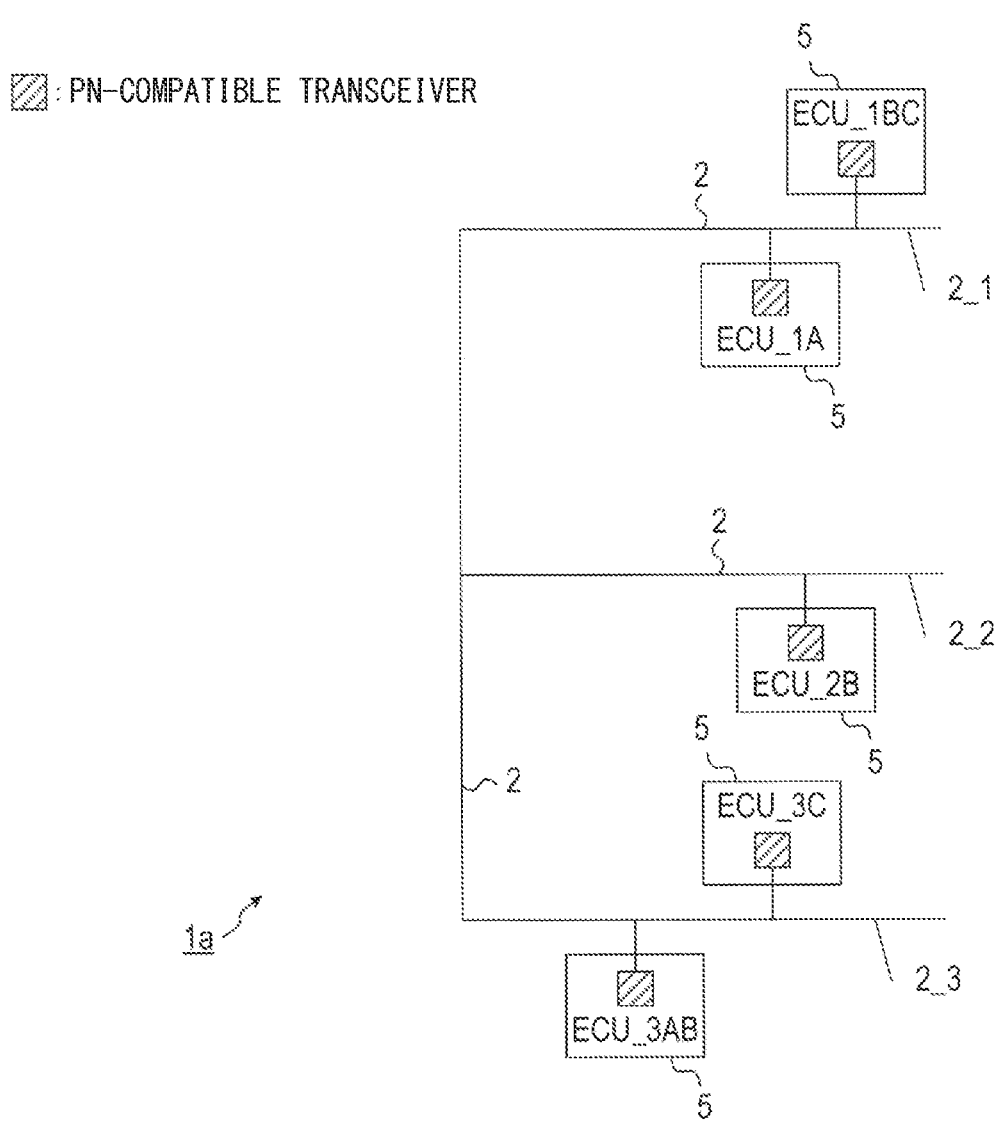
FIG. 12 is a block diagram illustrating the configuration of a network system of a second embodiment.

For example, as illustrated in FIG. 12, a network system 1a of the second embodiment includes the plurality of buses 2 and the plurality of terminal devices 5 like the first embodiment, but does not include the relay device 4. The bus 21 to the bus 2_3 are connected to be able to communicate with each other. Although the plurality of buses 2 are illustrated in FIG. 12, the number of buses 2 may be one in the network system 1a of the second embodiment.

In the network system 1a of the second embodiment, the terminal device 5 has the monitoring function and the all wakeup function, and the terminal device 5 that has made a transition to the sleep state last executes the monitoring function and the all wakeup function.

[2-2. The Startup Maintenance Processing by the Terminal Device]

Figure 13:
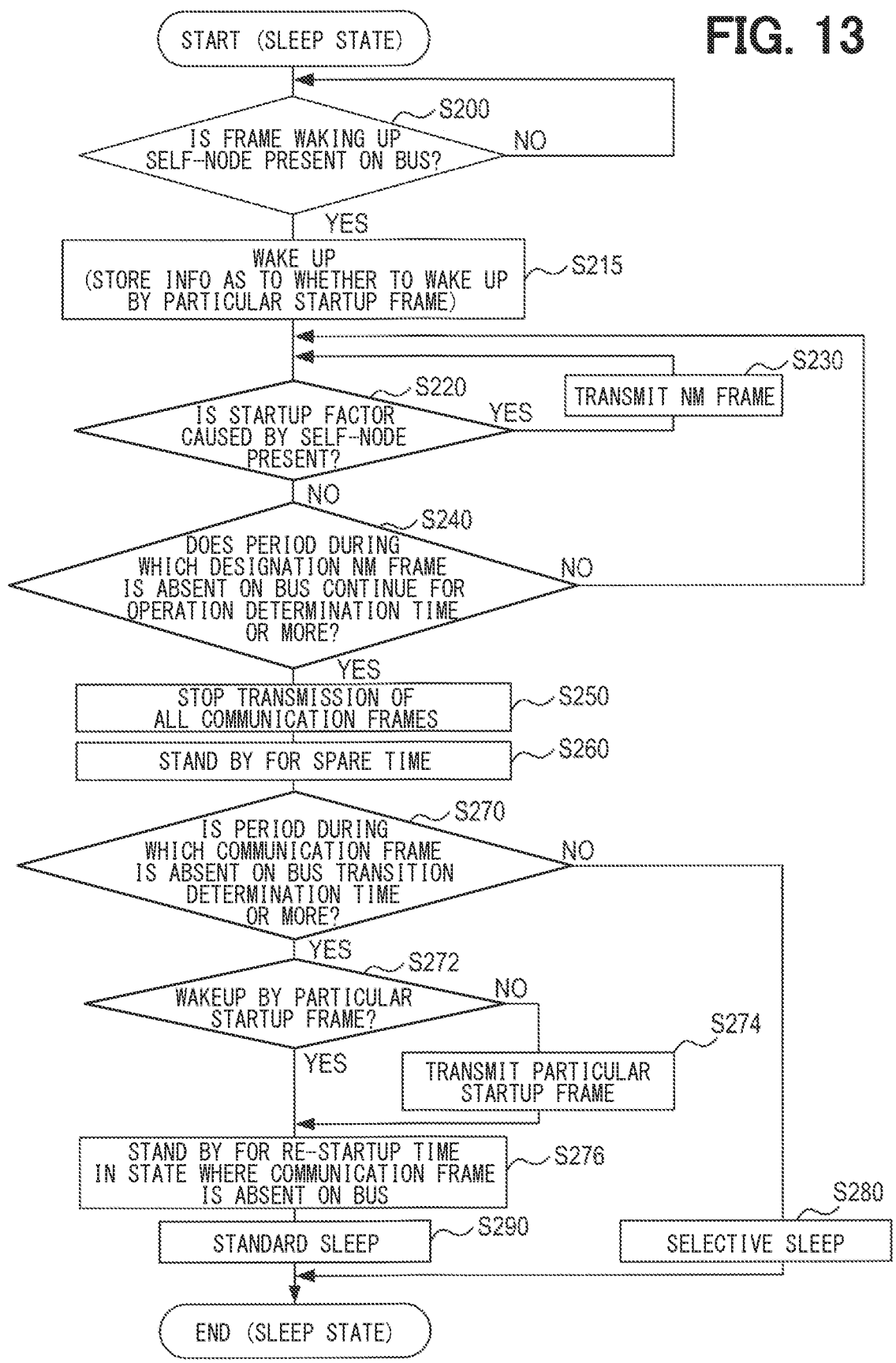
FIG. 13 is a flowchart of the startup maintenance processing executed by the MCU of the terminal device.

The content of the startup maintenance processing executed by the terminal device 5 of the second embodiment will be described with reference to the flowchart in FIG. 13. The startup maintenance processing of the second embodiment illustrated in FIG. 13 is different from the startup maintenance processing of the first embodiment illustrated in FIG. 8 in that the S210 is replaced with S215 and S272 to S276 are added.

In the S200, the transceiver 51 determines whether or not the communication frame waking up the self-node is present on the bus 2. Similar to the first embodiment, the transceiver 51 wakes up also by the reception of the particular startup frame also when the transceiver 51 performs the selective sleep or the standard sleep.

Figure 8:
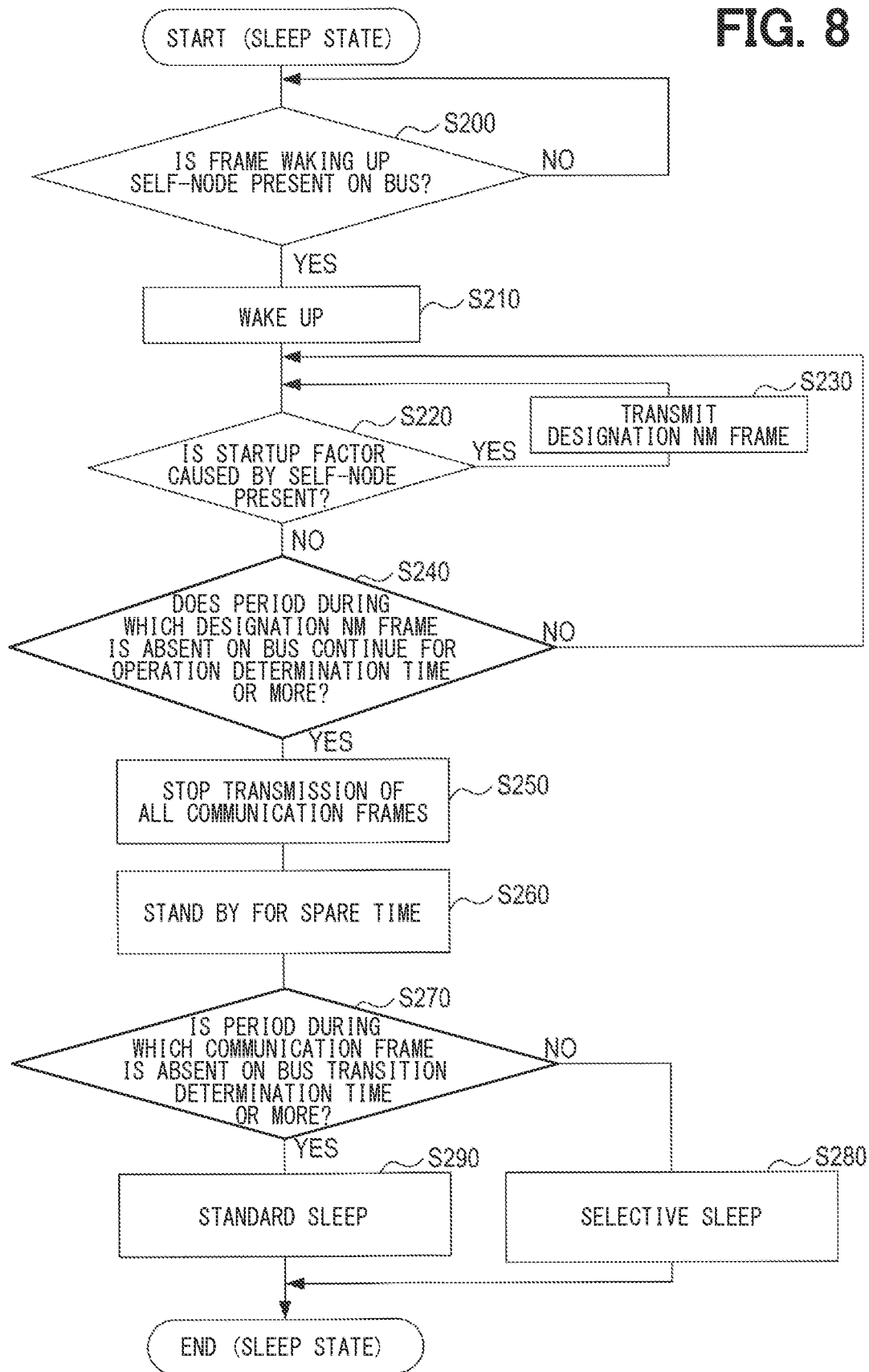
FIG. 8 is a flowchart of startup maintenance processing executed by an MCU of the terminal device.

In the S215, when waking up, the MCU 53 executes the same processing as the S210 illustrated in FIG. 8, and stores, in the memory 532, whether or not the wakeup in this step is the wakeup by the particular startup frame. For example, similar to the first embodiment, when the information representing whether or not the communication frame is the particular startup frame is included in the startup information, the MCU 53 may store the startup information of the received designation NM frame in the memory 532 in this step.

In the subsequent S220 to S260, the MCU 53 operates as with the S220 to the S260 of the first embodiment. That is, the MCU 53 detects that after the stop of the transmission of the designation NM frame, the non-designation period continues for the operation determination time or more, stops the transmission of the communication frames, and thereafter, is standby for the spare time, thereby shifting the processing to the S270.

Here, in the S270, when the transmission path empty period is less than the transition determination time, the MCU 53 shifts the processing to the S280, and causes the terminal device 5 to perform the selective sleep. On the other hand, in the S270, when it is determined that the transmission path empty period is the transition determination time or more, the MCU 53 shifts the processing to the S272.

In the S272, the MCU 53 determines whether or not the wakeup in the S215 is caused by the particular startup frame.

Here, the MCU 53 shifts the processing to the S276 when the wakeup in the S215 is caused by the particular startup frame. The MCU 53 is standby while the transmission path empty period continues for the transition determination time in the S276, and shifts the processing to the S290. In the S290, the MCU 53 performs the standard sleep. Thus, the MCU 53 ends the startup maintenance processing.

On the other hand, when the wakeup in the S215 is not caused by the particular startup frame, the MCU 53 shifts the processing to the S274, transmits the particular startup frame to the bus 2 in the S274, and shifts the processing to the S276. After the S276, the MCU 53 is standby while the transmission path empty period continues for the transition determination time, as described above, and performs the standard sleep. Thus, the MCU 53 ends the startup maintenance processing.

[2-3. Operation]

The operation of the network system 1a will be described below. Here, in the network system 1a, in the terminal devices 5 other than the terminal device 5 attempting to make a transition to the sleep last, similar to the first embodiment, the MCUs 53 execute the processing in the S270 to the S280, and cause the terminal devices 5 to perform the selective sleep once.

On the other hand, since other terminal devices 5 perform the selective sleep, the MCU 53 of the terminal device 5 attempting to sleep last in the network system 1a shifts the processing to the S272.

In the S272, the MCU 53 of the above-described terminal device 5 attempting to sleep last determines whether or not the wakeup in the S215 is caused by the particular startup frame. The MCU 53 determines that the wakeup is not caused by the particular startup frame, shifts the processing to the S274, and transmits the particular startup frame to the bus 2. The particular startup frame is the communication frame for waking up all the terminal devices 5, but even if the particular startup frame is received by the terminal device 5 that has already woken up, such the reception of the particular startup frame does not affect the processing in the subsequent terminal device 5 at all.

The MCU 53 of the above-described terminal device 5 attempting to sleep last shifts the processing to the S276 after the transmission of the particular startup frame to the bus 2, is standby in the S276 while the transmission path empty time continues for the transition determination time, and shifts the processing to the S290 to perform the standard sleep.

When the particular startup frame is transmitted, the terminal devices 5 other than the above-described terminal device 5 attempting to make a transition to the sleep last, which have already performed the selective sleep wake up once. The MCU 53 of each of these terminal devices 5 that have woken up by the particular startup frame executes the startup maintenance processing.

That is, the MCU 53 of each of the terminal devices 5 that have woken up by the particular startup frame determines that the non-designation period continues for the operation determination time or more and that the transmission path empty period continues for the preparation time or more, and in the S272, determines that the startup factor of the terminal device is the particular startup frame. The MCU 53 shifts the processing to the S276, is standby in the S276 while the transmission path empty time continues for the transition determination time, and shifts the processing to the S290 to perform the standard sleep.

Thus, since in the network system 1a, all the terminal devices 5 perform the standard sleep, power consumption when the terminal devices 5 are in the sleep state is reduced in the network system 1.

[2-4. Effect]

According to the second embodiment described above in detail, the effect (1a) of the above-described first embodiment is exerted, and further, the following effect is exerted.

(2a) The network system 1a includes the plurality of buses 2 and the plurality of terminal devices 5. The MCU 53 of each of the terminal devices 5 measures the non-designation period. In the MCU 53, a startup storage unit stores whether or not the terminal device 5 has woken up by the particular startup frame. The S215 corresponds to the processing as the startup storage unit. In the MCU 53, a startup determination unit determines whether or not the terminal device 5 has woken up by the particular startup frame. The S272 corresponds to the processing as the startup determination unit.

In the MCU 53, the switching unit transmits the particular startup frame when the non-designation period becomes the operation determination time or more, the transmission path empty period is the preparation time or more, and it is determined that the terminal device has not woken up by the particular startup frame. Also, when the terminal device 5 makes a transition to the wakeup state by the reception of the particular startup frame, the non-designation period continues for the operation determination time or more, and the transmission path empty period continues for the preparation time or more, it is determined that the terminal device 5 has woken up by the particular startup frame, so that the MCU 53 outputs the second switching instruction to the transceiver 51.

According to such a configuration, all the terminal devices 5 of the network system 1a can be caused to perform the standard sleep without including the relay device. That is, the system configuration can be simplified, and further, power consumption can be reduced.

In this embodiment, when the non-designation period becomes the operation determination time or more, and the transmission path empty period is the preparation time or more, it is determined that the terminal device has not woken up by the reception of the particular startup frame, which corresponds to the predetermined condition.

3. Third Embodiment

[3-1. The Point Different from the First Embodiment]

In the above-described first embodiment, when not receiving the designation NM frame for the predetermined time (that is, the operation determination time) or more, the terminal device 5 makes a transition to one of the selective sleep and the standard sleep according to the empty state of the bus 2. On the other hand, the third embodiment is different from the first embodiment in that when not receiving the designation NM frame for the predetermined time or more, the terminal device 5 makes a transition to the selective sleep irrespective of the empty state of the bus 2. The relay device 4 of the third embodiment is configured like the first embodiment in that the relay device 4 monitors the empty state of the bus 2, and transmits the particular startup frame to the bus 2 when the empty state of the bus 2 continues for the predetermined monitoring time or more. For example, the preparation time corresponds to the monitoring time.

For example, although not illustrated, a network system 1b of the third embodiment includes the plurality of buses 2, the plurality of terminal devices 5, and the relay device 4 like the network system 1 of the first embodiment illustrated in FIG. 1.

[3-2. The Startup Maintenance Processing by the Terminal Device]

Figure 14:
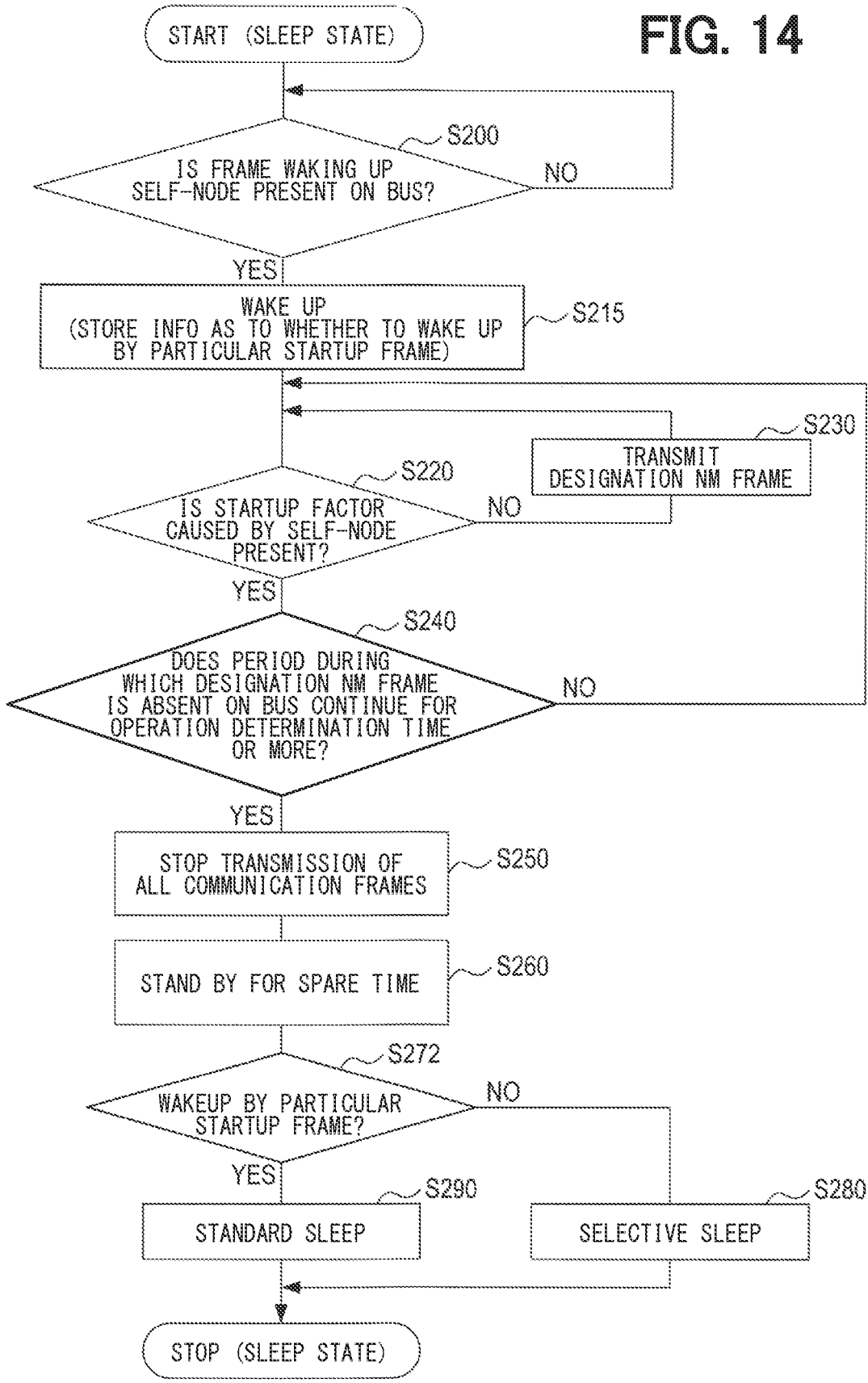
FIG. 14 is a flowchart of the startup maintenance processing executed by the MCU of the terminal device of a third embodiment.

The content of the startup maintenance processing executed by the terminal device 5 of the third embodiment will be described with reference to the flowchart in FIG. 14. In the startup maintenance processing illustrated in FIG. 14, the S210 in the startup maintenance processing of the first embodiment illustrated in FIG. 8 is replaced with the S215, and the S270 is replaced with the S272. Since the S200 to the S260 are the same as the S200 to the S260 of the second embodiment illustrated in FIG. 13, the description is simplified here.

In the S215 to the S260, when the non-designation period continues for the operation determination time or more, the MCU 53 of the terminal device 5 stops the transmission of the communication frame, and thereafter, is standby for the spare time, thereby shifting the processing to the S272.

In the S272, the MCU 53 determines whether or not the wakeup in the S215 is caused by the particular startup frame.

Here, when the wakeup in the S215 is not caused by the particular startup frame, the MCU 53 shifts the processing to the S280, and causes the terminal device 5 to perform the selective sleep in the S280. Thus, the MCU 53 ends the startup maintenance processing.

On the other hand, when the wakeup in the S215 is caused by the particular startup frame, the MCU 53 shifts the processing to the S290, and causes the terminal device 5 to perform the standard sleep in the S290. Thus, the MCU 53 ends the startup maintenance processing.

Figure 9:
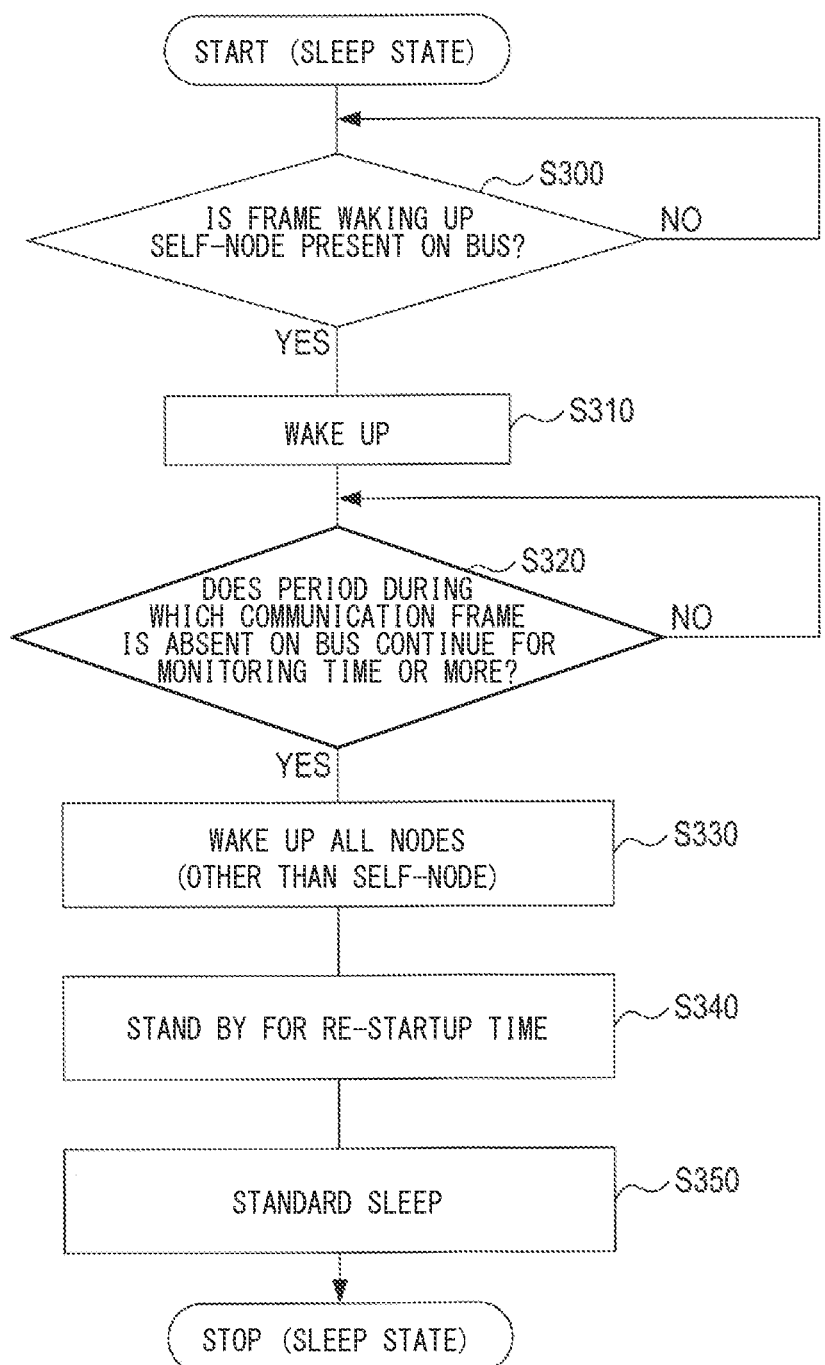
FIG. 9 is a flowchart of monitoring startup processing executed by an MCU of the relay device.

The relay device 4 executes the monitoring startup processing illustrated in FIG. 9 like the relay device 4 of the first embodiment.

[3-3. Operation]

The operation of the network system 1b will be described below. Unlike the first embodiment and the second embodiment, in the network system 1b, all the terminal devices 5 perform the selective sleep once. That is, both the terminal device 5 attempting to sleep last and the terminal devices 5 other than the terminal device 5 attempting to make a transition to the sleep last perform the selective sleep once. When receiving the particular startup frame from the relay device 4 monitoring the empty state of the bus 2, each of all these terminal devices 5 that have performed the selective sleep wakes up, and performs the standard sleep when thereafter, the state where the bus 2 is empty continues.

[3-4. Effect]

According to the third embodiment described above in detail, the effect (1a) of the above-described first embodiment is exerted, and further, the following effect is exerted.

(3a) The network system 1b includes the plurality of buses 2, the plurality of terminal devices 5, and the relay device 4. The network system 1b includes at least one monitoring startup unit. The monitoring startup unit measures the transmission path empty period, and transmits the particular startup frame when the transmission path empty period is at least the monitoring time or more longer than the preparation time. In this embodiment, the relay device 4 includes the monitoring startup unit. The S330 executed by the MCU 43 corresponds to the monitoring startup unit.

In the MCU 53 of the terminal device 5, the startup storage unit stores whether or not the terminal device 5 has woken up by the particular startup frame. In the MCU 53, the startup determination unit determines whether or not the terminal device 5 has woken up by the particular startup frame.

Here, in the MCU 53, the switching unit transmits the first switching instruction when after the terminal device makes a transition to the wakeup state, at least the non-designation period becomes the operation determination time or more, and it is then determined that the terminal device 5 has woken up by the communication frame other than the particular startup frame. On the other hand, when it is determined that the terminal device 5 has woken up by the particular startup frame, the second switching instruction is outputted to the transceiver 51.

According to the network system 1b configured in this way, the processing of the terminal device 5 can be simplified.

4. Fourth Embodiment

In the above-described first embodiment, the second switching instruction is the switching instruction for supplying electricity to the second standby unit. On the other hand, the fourth embodiment is different from the first embodiment in that the terminal device 5 outputs, as the second switching instruction, the switching instruction for supplying, to the second standby unit, a clock signal for driving the second standby unit.

Figure 15:
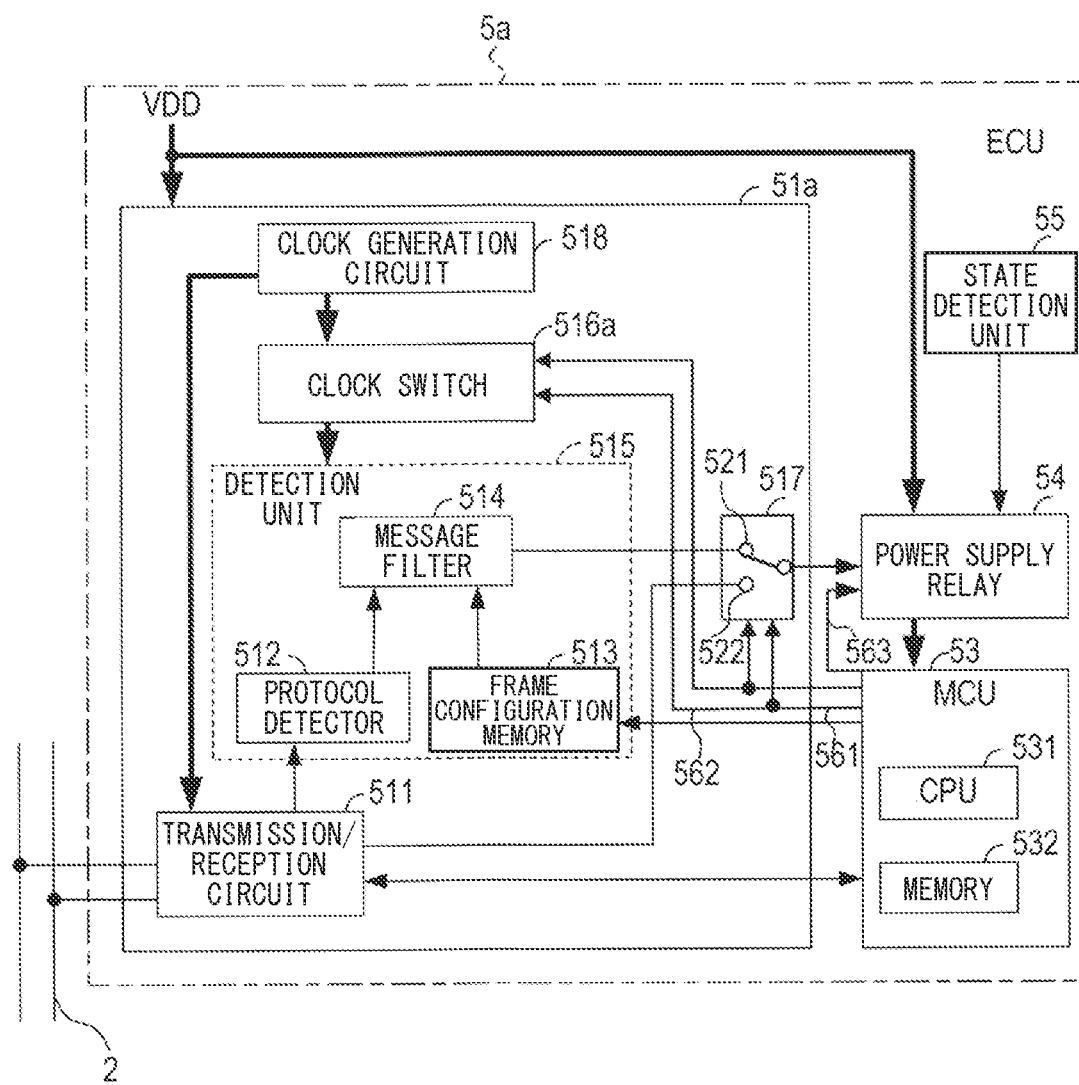
FIG. 15 is a block diagram illustrating the configuration of a transceiver of a terminal device of a fourth embodiment.

For example, as illustrated in FIG. 15, in a transceiver 51a included in a terminal device 5a of the fourth embodiment, the power supply switch 516 of the transceiver 51 illustrated in FIG. 5 is replaced with a clock switch 516a, and a clock generation circuit 518 is added.

The clock generation circuit 518 generates the clock signal for operating the transmission/reception circuit 511 and the detection unit 515. Like the execution and stop of the electric supply to the detection unit 515 by the power supply switch 516 according to the switching instruction, the clock switch 516a executes and stops the supply of the clock signal to the detection unit 515 according to the switching instruction.

The detection unit 515 of the transceiver 51a stops the operation when the supply of the clock signal is stopped. That is, in the transceiver 51a, the supply of the clock signal is stopped, so that power consumption is reduced when the transceiver 51a operates as the PN-compatible transceiver, in other words, when the terminal device 5a performs the selective sleep.

When the terminal device 5 is configured in this way, the power consumption of the terminal device 5 at the time of performing the selective sleep can be reduced without stopping the electric supply to the detection unit 515.

5. Other Embodiments

The embodiments of this disclosure have been described above, but this disclosure is not limited to the above-described embodiments, and can be variously modified and embodied.

(5a) In the above-described embodiments, the example in which the terminal device 5 is the ECU has been described, but this disclosure is not limited to this. At least one of the terminal devices 5 may be the GW that communicatably connects the plurality of buses 2 to which the terminal devices 5 are connected.

(5b) In the above-described first embodiment, the network system 1 includes one relay device 4 executing the monitoring control processing, but may include a plurality of relay devices 4 executing the same monitoring control processing as the relay device 4. In the above-described embodiments, the transceiver 41 included in the relay device 4 is the PN-incompatible transceiver, but the transceiver 41 may be the PN-compatible transceiver.

In addition, in the above-described third embodiment, in the network system 1b, at least one predetermined terminal device 5 of the plurality of terminal devices 5 may be further configured to execute the same monitoring startup processing as the relay device 4 of the third embodiment in place of the startup maintenance processing. The transceiver included in the terminal device 5 may be configured as the same PN-incompatible transceiver as the transceiver 41. Alternatively, in the network system 1b, in place of the relay device 4, at least one predetermined terminal device 5 of the plurality of terminal devices 5 may be configured to execute the same monitoring startup processing as the relay device 4 of the third embodiment in place of the startup maintenance processing. In this case, the relay device 4 is not necessarily required to execute the monitoring startup processing. The network system 1b may include the relay device 4, or is not necessarily required to include the relay device 4.

(5c) In the above-described embodiments, the transceiver 51 of the terminal device 5 performing the standard sleep wakes up by the reception of any communication frame, and after waking up, operates as the PN-compatible transceiver by the wakeup instruction from the MCU 53. However, this disclosure is not limited to this. For example, the transceiver 51 performing the standard sleep may wake up by the reception of any communication frame, operate as the PN-incompatible transceiver as-is, and receive the same instruction as the wakeup instruction from the MCU 53 at any timing to be replaced with the PN-compatible transceiver.

(5d) The MCU 43, the MCU 53, and the technique thereof described in this disclosure may be achieved by a dedicated computer provided by configuring a processor and a memory programmed to execute one or a plurality of functions embodied by a computer program. Alternatively, the MCU 43, the MCU 53, and the technique thereof described in this disclosure may be achieved by a dedicated computer provided by configuring a processor by one or more exclusive hardware logic circuits. Alternatively, the MCU 43, the MCU 53, and the technique thereof described in this disclosure may be achieved by one or more dedicated computers configured of the combination of a processor and a memory programmed to execute one or a plurality of functions and a processor configured of one or more hardware logic circuits. In addition, a computer program may be stored, as an instruction executed by a computer, in a computer-readable non-transitory tangible storage medium. The technique for achieving the function of each portion included in the MCU 43 and the MCU 53 is not necessarily required to include software, and all the functions thereof may be achieved by using one or a plurality of hardware.

(5e) A plurality of functions that one component in the above-described embodiments has may be achieved by a plurality of components, or one function that one component has may be achieved by a plurality of components. Also, a plurality of functions that a plurality of components have may be achieved by one component, or one function achieved by a plurality of components may be achieved by one component. Also, part of the configuration of each of the above-described embodiments may be omitted. Also, at least part of the configuration of each of the above-described embodiments may be added to or replaced with the configurations of other embodiments described above.

(5f) In addition to each of the above-described network systems, this disclosure can also be achieved in various forms, such as the terminal device and the relay device configuring the network system, the program for functioning the computer as the terminal device and the relay device, the non-transitory tangible storage medium, such as the semiconductor memory recording this program, and the startup control method.

The invention claimed is:

1. A network system comprising:
at least one transmission path; and
a plurality of terminal devices each connected to the transmission path, wherein
each of the terminal devices includes:
a transceiver having:
a first standby unit that is configured to change the terminal device from a sleep state where a designation function is stopped to a wakeup state where the designation function is executable when receiving a designation management frame that is a type of a communication frame transmitted and received through the transmission path and that is given at least startup information necessary for identifying a startup group to which the terminal device belongs; and
a second standby unit that is configured to change the terminal device from the sleep state to the wakeup state when receiving any communication frame, wherein the second standby unit is configured to operate with power consumption lower than the first standby unit, wherein the transceiver is configured to operate either one of the first standby unit and the second standby unit according to a switching instruction;

a startup processing unit configured to:
  transmit the designation management frame to the transmission path while an internal factor continues when the terminal device wakes up by the internal factor that is a factor other than that of receiving the designation management frame; and
  not transmit the designation management frame to the transmission path when the internal factor is not generated; and a switching unit configured to output the switching instruction to the transceiver to operate the second standby unit when a transmission path empty period during which the communication frame is neither transmitted nor received through the transmission path lasts for a predetermined preparation time or more after a non-designation period during which the designation management frame is not received through the transmission path has lasted for a predetermined operation determination time or more.

2. The network system according to claim 1, wherein the switching unit includes:
  an empty period determination unit that is configured to determine whether the transmission path empty period is equal to or more than the preparation time after the non-designation period has lasted for the operation determination time or more;
  a first switching execution unit that is configured to output the switching instruction to the transceiver to operate the first standby unit when the empty period determination unit determines that the transmission path empty period is less than the preparation time after the non-designation period has lasted for the operation determination time or more; and
  a second switching execution unit that is configured to output the switching instruction to the transceiver to operate the second standby unit when the empty period determination unit determines that the transmission path empty period is equal to or more than the preparation time after the non-designation period has lasted for the operation determination time or more.

3. The network system according to claim 2, further comprising:
  at least one monitoring startup unit, wherein
  the at least one monitoring startup unit is configured to transmit a particular startup frame that is a type of the communication frame to wake up all the terminal devices connected to the transmission path when a predetermined condition is satisfied,
  the first standby unit is configured to change the terminal device from the sleep state to the wakeup state when receiving the particular startup frame,
  the second standby unit is configured to change the terminal device from the sleep state to the wakeup state when receiving the particular startup frame, and
  the switching unit is configured to output the switching instruction to the transceiver to operate the second standby unit when the transmission path empty period is determined to be equal to or more than the preparation time after (i) the terminal device woke up by receiving the particular startup frame and then (ii) the non-designation period has lasted for the operation determination time or more.

4. The network system according to claim 3, further comprising:
  at least one relay device configured to connect a plurality of transmission paths to each other, wherein
  the relay device includes the monitoring startup unit, and
  the monitoring startup unit is configured to:
    measure the transmission path empty period; and
    transmit the particular startup frame when the transmission path empty period lasts for a predetermined monitoring time or more that is longer than the preparation time.

5. The network system according to claim 3, wherein the terminal device further includes:
  the monitoring startup unit;
  a startup storage unit configured to store information that the terminal device wakes up by the particular startup frame; and
  a startup determination unit configured to determine whether the terminal device wakes up by the particular startup frame, and
  the switching unit is configured to:
    cause the monitoring startup unit to transmit the particular startup frame to the transmission path when the transmission path empty period lasts for the preparation time or more after the non-designation period has lasted for the operation determination time or more and when the startup determination unit determines that the terminal device does not wake up by the particular startup frame; and
    output the switching instruction to the transceiver to operate the second standby unit when the transmission path empty period lasts for the preparation time or more after the non-designation period has lasted for the operation determination time or more and when the startup determination unit determines that the terminal device wakes up by the particular startup frame.

6. The network system according to claim 1, further comprising
  at least one monitoring startup unit, wherein
  the monitoring startup unit is configured to:
    measure the transmission path empty period; and
    transmit a particular startup frame that is a type of the communication frame to wake up all the terminal devices connected to the transmission path when the transmission path empty period lasts for a predetermined monitoring time or more that is longer than at least the preparation time,
  the first standby unit is configured to change the terminal device from the sleep state to the wakeup state when receiving the particular startup frame;
  the second standby unit is configured to change the terminal device from the sleep state to the wakeup state when receiving the particular startup frame;
  the terminal device further includes:
    a startup storage unit that is configured to store information that the terminal device wakes up by the particular startup frame; and
    a startup determination unit that is configured to determine whether the terminal device wakes up by the particular startup frame, and
  the switching unit is configured to, when the non-designation period lasts for the operation determination time or more after the terminal device waked up:

output the switching instruction to the transceiver to operate the first standby unit when the startup determination unit determines that the terminal device wakes up by the communication frame other than the particular startup frame; and output the switching instruction to the transceiver to operate the second standby unit when the startup determination unit determines that the terminal device wakes up by the particular startup frame.

7. The network system according to claim 6, further comprising:

at least one relay device configured to connect a plurality of transmission paths to each other, wherein the relay device includes the monitoring startup unit.

8. The network system according to claim 6, wherein at least one predetermined terminal device of the plurality of terminal devices includes the monitoring startup unit.

9. The network system according to claim 1, wherein the switching unit is configured to output the switching instruction to the transceiver to supply electricity to the second standby unit.

10. The network system according to claim 1, wherein the switching unit is configured to output the switching instruction to the transceiver to supply, to the second standby unit, a clock signal for driving the second standby unit.

\* \* \* \* \*